US012764526B2

(12) United States Patent
Kunz et al.

(10) Patent No.: US 12,764,526 B2
(45) Date of Patent: Oct. 13, 2026

(54) KEY MANAGEMENT FOR MACHINE LEARNING MODELS

(71) Applicant: LENOVO (SINGAPORE) PTE. LTD., Singapore (SG)

(72) Inventors: Andreas Kunz, Ladenburg (DE); Dimitrios Karampatsis, Ruislip (GB); Sheeba Backia Mary Baskaran, Friedrichsdorf (DE)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 49 days.

(21) Appl. No.: 19/102,007

(22) PCT Filed: Oct. 17, 2022

(86) PCT No.: PCT/EP2022/078883
§ 371 (c)(1),
(2) Date: Feb. 7, 2025

(87) PCT Pub. No.: WO2024/032918
PCT Pub. Date: Feb. 15, 2024

(65) Prior Publication Data
US 2026/0046614 A1 Feb. 12, 2026

(30) Foreign Application Priority Data
Aug. 11, 2022 (GR) .............................. 20220100681

(51) Int. Cl.
*H04W 12/037* (2021.01)
*H04L 9/32* (2006.01)
(Continued)

(52) U.S. Cl.
CPC ......... *H04W 12/037* (2021.01); *H04L 9/3297* (2013.01); *H04W 12/61* (2021.01)

(58) Field of Classification Search
CPC ............... H04W 12/037; H04W 12/61; H04W 12/0433; H04L 9/3297; H04L 41/28; H04L 43/12; H04L 41/16
See application file for complete search history.

(56) References Cited

U.S. PATENT DOCUMENTS 11,138,517 B2 * 10/2021 Sanketi .................... G06N 5/04
11,928,247 B2 * 3/2024 Lin ....................... H04L 9/0825
(Continued)

FOREIGN PATENT DOCUMENTS

WO 2022069063 A1 4/2022
WO 2024032918 A1 2/2024

OTHER PUBLICATIONS

"Study on security aspects of enablers for network automation for the 5G system Phase 3", 3GPP TR 33.738, V0.2.0 [retrieved Apr. 28, 2023]. Retrieved from the Internet <https://portal.3gpp.org/desktopmodules/Specifications/SpecificationDetails.aspx?specificationId=4049>, Jul. 2022, 27 pages.
(Continued)

*Primary Examiner* — Darren B Schwartz
(74) *Attorney, Agent, or Firm* — FIG. 1 Patents

(57) ABSTRACT

Various aspects of the present disclosure relate to a wireless communications system that includes a network data analytics function (NWDAF) containing a model training logical function (MTLF), an NWDAF containing an analytics logical function (AnLF), and an analytics data repository function (ADRF). The NWDAF containing the MTLF generates a security context that protects a machine learning (ML) model that is stored in the ADRF. An NWDAF containing the AnLF obtains the protected ML model from the ADRF and obtains the security context from the NWDAF containing the MTLF. The security context is managed using a storage duration time that indicates when the ADRF is to delete the protected ML and the NWDAF
(Continued)

containing the MTLF is to delete the security context, or a validity time that indicates when the ADRF is to delete the protected ML and the NWDAF containing the MTLF is to delete the security context.

20 Claims, 15 Drawing Sheets

(51) Int. Cl.
*H04L 41/28* (2022.01)
*H04L 43/12* (2022.01)
*H04W 12/0433* (2021.01)
*H04W 12/61* (2021.01)

(56) References Cited

U.S. PATENT DOCUMENTS

| | | | | |
|---|---|---|---|---|
| 12,061,956 | B1 * | 8/2024 | Pushkin | G06N 20/00 |
| 12,353,524 | B2 * | 7/2025 | Yue | G06F 21/64 |
| 2018/0024942 | A1 | 1/2018 | Canepa et al. | |
| 2019/0156244 | A1 * | 5/2019 | Faulhaber, Jr. | G06N 20/00 |
| 2019/0220758 | A1 * | 7/2019 | Talyansky | G06N 20/00 |
| 2020/0233979 | A1 * | 7/2020 | Tahmasebi Maraghoosh | G06F 21/64 |
| 2020/0320417 | A1 * | 10/2020 | Corning | G06F 21/85 |
| 2021/0304070 | A1 * | 9/2021 | Takashige | G06N 5/04 |
| 2022/0237506 | A1 * | 7/2022 | Feldman | G06F 9/45558 |
| 2022/0294606 | A1 * | 9/2022 | Norrman | G06N 20/00 |
| 2022/0329493 | A1 * | 10/2022 | Hong | G06F 16/2458 |
| 2022/0371705 | A1 * | 11/2022 | Poikonen | H04L 67/34 |
| 2023/0127558 | A1 * | 4/2023 | Chong | H04L 41/145<br>709/224 |
| 2023/0276263 | A1 * | 8/2023 | Rydén | G06N 3/098<br>455/414.1 |
| 2023/0342669 | A1 * | 10/2023 | Shao | H04L 9/008 |
| 2023/0396435 | A1 * | 12/2023 | Baldwin | H04L 9/30 |

OTHER PUBLICATIONS

Kunz, et al., “Update of solution #4”, 3GPP TSG-SA3 Meeting #109, S3-223217, Toulouse, France [retrieved Apr. 28, 2023]. Retrieved from the Internet <https://www.3gpp.org/ftp/tsg_sa/WG3_Security/TSGS3_109/Docs>, Nov. 2022, 5 pages.

“International Search Report and Written Opinion”, International Application No. PCT/EP2022/078883, Apr. 14, 2023, 16 pages.

* cited by examiner

KEY MANAGEMENT FOR MACHINE LEARNING MODELS

TECHNICAL FIELD

The present disclosure relates to wireless communications, and more specifically to managing keys for machine learning (ML) models.

BACKGROUND

A wireless communications system may include one or multiple network communication devices, such as base stations, which may be otherwise known as an eNodeB (eNB), a next-generation NodeB (gNB), or other suitable terminology. Each network communication devices, such as a base station may support wireless communications for one or multiple user communication devices, which may be otherwise known as user equipment (UE), or other suitable terminology. The wireless communications system may support wireless communications with one or multiple user communication devices by utilizing resources of the wireless communication system (e.g., time resources (e.g., symbols, slots, subframes, frames, or the like) or frequency resources (e.g., subcarriers, carriers). Additionally, the wireless communications system may support wireless communications across various radio access technologies including third generation (3G) radio access technology, fourth generation (4G) radio access technology, fifth generation (5G) radio access technology, among other suitable radio access technologies beyond 5G (e.g., sixth generation (6G)).

In some cases, the wireless communications system may support use of artificial intelligence (AI) or ML. For example, the wireless communications system may include various components or functions that use a ML model. Such functions retrieve the ML model from another component or function in the wireless communications system, which may be referred to as a data producer.

SUMMARY

The present disclosure relates to methods, apparatuses, and systems that support managing keys for machine learning (ML) models. A core network of the wireless communications system includes a network data analytics function (NWDAF) containing a model training logical function (MTLF), an NWDAF containing an analytics logical function (AnLF), and an analytics data repository function (ADRF). The NWDAF containing the MTLF generates a security context (e.g., encryption key and integrity protection key) that protects an ML model that is stored in the ADRF. When the NWDAF containing the AnLF desires to use the ML model, the NWDAF containing the AnLF obtains the protected ML model from the ADRF and obtains the security context from the NWDAF containing the MTLF, allowing the NWDAF containing the AnLF to decrypt the protected ML model. The security context is managed using one or both of a storage duration time that indicates when the ADRF is to delete the protected ML and the NWDAF containing the MTLF is to delete the security context, and a validity time that indicates when the ADRF is to delete the protected ML and the NWDAF containing the MTLF is to delete the security context. By managing the security context for an protected ML in this manner, security of the wireless communications system is enhanced due to the security context having a limited lifespan after which the security context is deleted.

Some implementations of the method and apparatuses described herein may further include to: transmit, to a NWDAF containing a MTLF, a first signaling indicating a request to provision a ML model; receive, from the NWDAF containing the MTLF, a second signaling indicating a first protected ML model that has been protected using a first security context; store at least one of a first validity time for the first security context and a first storage duration for the first protected ML model; and delete the protected ML model in response to the first the first validity time expiring or the first storage duration expiring.

In some implementations of the method and apparatuses described herein, the second signaling further indicates the first validity time. Additionally or alternatively, the second signaling further indicates the first validity time, and methods and apparatuses store the validity time for the first security context. Additionally or alternatively, the methods and apparatuses transmit, to the NWDAF containing the MTLF, a third signaling indicating a request to update training of the ML model; and receive, from the NWDAF containing the MTLF, a fourth signaling indicating a second protected ML model and a second validity time for a second security context for the second protected ML. Additionally or alternatively, the methods and apparatuses receive, from the NWDAF containing the MTLF, a third signaling indicating a second validity time and a second protected ML model that has been protected using a second security context; and store the second validity time and the second protected ML. Additionally or alternatively, the methods and apparatuses receive, from the NWDAF containing the MTLF in response to the first validity time for the first security context having expired but the first storage duration time for the first protected ML not having expired, a third signaling indicating a second validity time and a second protected ML model that has been protected using a second security context; and store the second validity time and the second protected ML. Additionally or alternatively, the methods and apparatuses transmit, to a network function repository function (NRF), a third signaling indicating a discovery request for the NWDAF containing the MTLF; receive, from the NRF, a fourth signaling indicating the first storage duration and the NWDAF containing the MTLF; and store the first storage duration with an analytics identifier of an NWDAF containing an AnLF. Additionally or alternatively, the methods and apparatuses generate the first storage duration; and store the first storage duration with an analytics identifier of a NWDAF containing an AnLF. Additionally or alternatively, the methods and apparatuses transmit, to the NWDAF containing the MTLF, a third signaling indicating the storage duration. Additionally or alternatively, the first security context comprises an encryption key and an integrity protection key.

Some implementations of the method and apparatuses described herein may further include to: receive, from an ADRF, a first signaling indicating a request to provision a ML model; generate a first security context; encrypt, using the first security context, the ML model resulting in a first protected ML model; store the first security context and at least one of a first storage duration for the protected ML and a first validity time for the first security context; transmit, to the ADRF, a second signaling indicating the first protected ML model; and delete the first security context in response to the first validity time expiring or the first storage duration expiring.

In some implementations of the method and apparatuses described herein, the method and apparatuses are to generate the first validity time for the first security context; store the first validity time; and transmit, to the ADRF, the second signaling indicating the first validity time. Additionally or alternatively, the methods and apparatuses receive, from the ADRF, a third signaling indicating a request to update training of the ML model; and transmit, to the ADRF, a fourth signaling indicating a second protected ML model and a second validity time for a second security context for the second protected ML. Additionally or alternatively, the methods and apparatuses generate a second security context; encrypt, using the second security context, the ML model resulting in a second protected ML model; generate a second validity time for the second security context; store the second security context and the second validity time; and transmit, to the ADRF, a third signaling indicating the second validity time and the second protected ML. Additionally or alternatively, the methods and apparatuses, in response to the first validity time for the first security context having expired but the first storage duration time for the first protected ML not having expired: generate a second security context; encrypt, using the second security context, the ML model resulting in a second protected ML model; generate a second validity time for the second security context; store the second security context and the second validity time; and transmit, to the ADRF, a third signaling indicating the second validity time and the second protected ML. Additionally or alternatively, the methods and apparatuses receive, from the ADRF, the storage duration; and store the storage duration. Additionally or alternatively, the methods and apparatuses delete the first security context in response to the storage duration expiring. Additionally or alternatively, the methods and apparatuses receive a third signaling indicating a request to unsubscribe from the ML model; and delete the first security context in response to the third signaling. Additionally or alternatively, the first security context comprises an encryption key and an integrity protection key.

DETAILED DESCRIPTION

Figure 1:
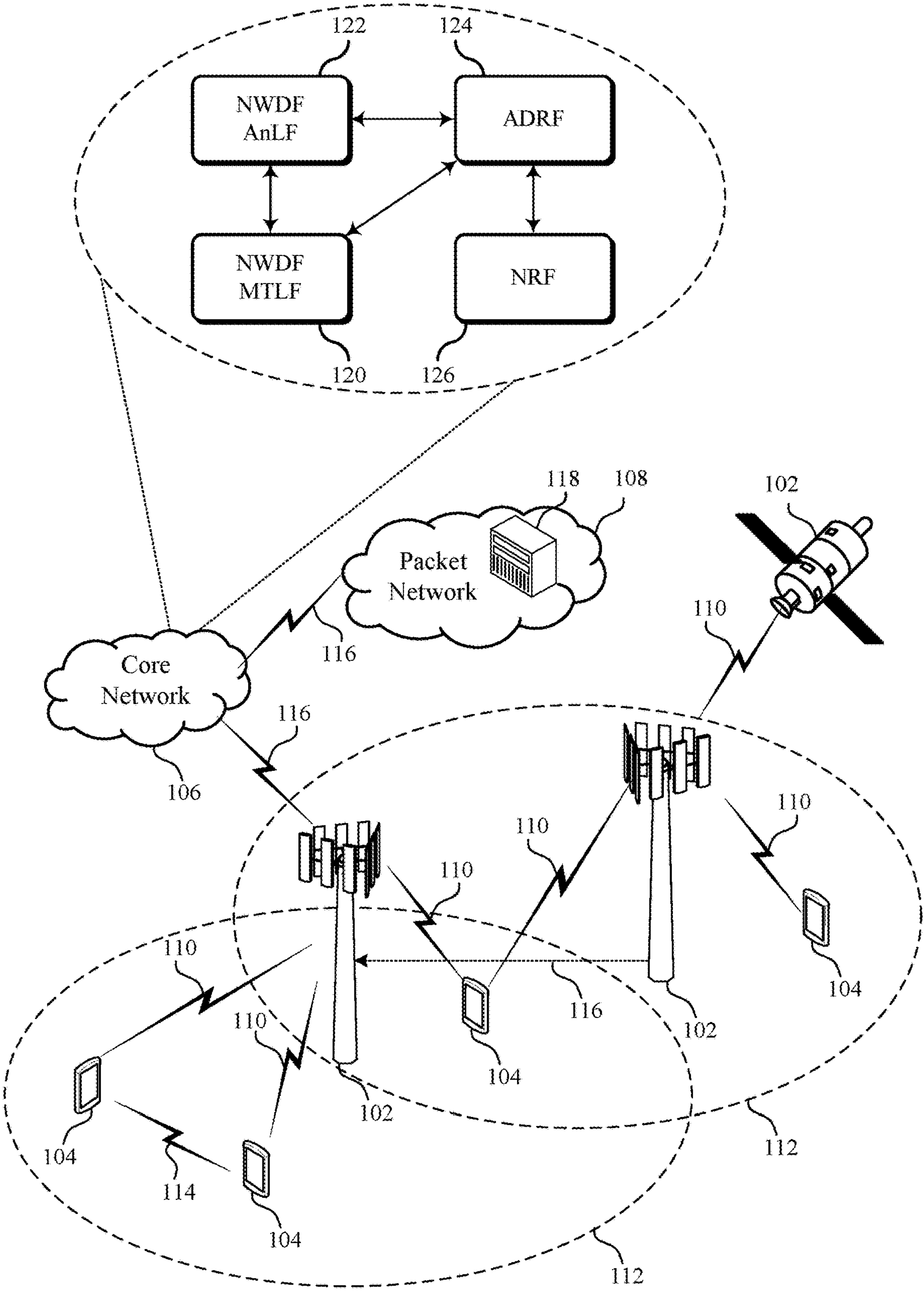
FIG. 1 illustrates an example of a wireless communications system that supports key management for machine learning models in accordance with aspects of the present disclosure.

A solution on the protection of a ML model in a repository involves protecting the ML model with a security context (e.g., key such as symmetric keys), but lacks any mechanism of key management of these security keys. These keys might need to be refreshed or deleted at some point in time, however there is currently no provision or mechanism for when and how to remove the security context and how to refresh the security keys.

Using the techniques discussed herein, a core network of a wireless communications system includes a NWDAF containing a MTLF, an NWDAF containing an AnLF, and an ADRF. The NWDAF containing the MTLF generates a security context, such as an encryption key and an integrity protection key, that protects an ML model that is stored in the ADRF. When the NWDAF containing the AnLF desires to use the ML model, the NWDAF containing the AnLF obtains the protected ML model from the ADRF and obtains the security context from the NWDAF containing the MTLF, allowing the NWDAF containing the AnLF to use the protected ML model (e.g., decrypt the protected ML model). The security context is managed using one or both of a storage duration time for the repository (e.g., the ADRF) and a validity time for the security context. Once one of the timers expires, the ML model and the security context are deleted and if the validity timer is shorter than the storage duration time, a new security context can be created and stored until the storage duration time is expired or the ML model is no longer required to be stored.

In one or more implementations, the ADRF retrieves from a network function repository function (NRF) a storage duration time ADRF generates a storage duration time if not received from the NRF. The storage duration time is provisioned to the NWDAF containing MTLF when requesting the ML model. The storage duration time indicates to the ADRF when to delete the ML model and to the NWDAF containing MTLF when to remove the security context.

Additionally or alternatively, the NWDAF containing MTLF generates a validity time for the security context and provides it to the ADRF together with the protected (e.g., encrypted) ML model. The validity time indicates to the ADRF when to delete the ML model and to the NWDAF containing MTLF when to remove the security context.

Additionally or alternatively, once the ML model and the security context are deleted but the ADRF either indicates a storage duration time longer than the old validity time or the ADRF did not unsubscribe to the NWDAF containing MTLF, then the NWDAF containing MTLF creates a new security context and validity time, protects (e.g., encrypts) the ML model, and sends the ML model and the validity time to the ADRF for further storage.

By managing the security context for an protected ML in this manner, security of the wireless communications system is enhanced due to one or both of the security context having a validity time and the storage duration having a storage duration. The security context is deleted after the validity time expires, and the protected ML is deleted after the storage duration expires. Furthermore, use of storage space is reduced in various devices (e.g., implementing the ADRF or the NWDAF containing the MTLF) because storage of the protected model and the security context are deleted after the storage duration or validity time have expired. Additionally, security of the wireless communications system is improved because various devices (e.g., implementing the ADRF or the NWDAF containing the MTLF) because the protected model and the security context are deleted after the storage duration or validity time have expired.

Aspects of the present disclosure are described in the context of a wireless communications system. Aspects of the present disclosure are further illustrated and described with reference to device diagrams and flowcharts.

FIG. 1 illustrates an example of a wireless communications system 100 that supports key management for machine learning models in accordance with aspects of the present disclosure. The wireless communications system 100 may include one or more network entities 102, one or more UEs 104, a core network 106, and a packet data network 108. The wireless communications system 100 may support various radio access technologies. In some implementations, the wireless communications system 100 may be a 4G network, such as an LTE network or an LTE-Advanced (LTE-A) network. In some other implementations, the wireless communications system 100 may be a 5G network, such as an NR network. In other implementations, the wireless communications system 100 may be a combination of a 4G network and a 5G network, or other suitable radio access technology including Institute of Electrical and Electronics Engineers (IEEE) 802.11 (Wi-Fi), IEEE 802.16 (WiMAX), IEEE 802.20. The wireless communications system 100 may support radio access technologies beyond 5G. Additionally, the wireless communications system 100 may support technologies, such as time division multiple access (TDMA), frequency division multiple access (FDMA), or code division multiple access (CDMA), etc.

The one or more network entities 102 may be dispersed throughout a geographic region to form the wireless communications system 100. One or more of the network entities 102 described herein may be or include or may be referred to as a network node, a base station, a network element, a radio access network (RAN), a base transceiver station, an access point, a NodeB, an eNodeB (eNB), a next-generation NodeB (gNB), or other suitable terminology. A network entity 102 and a UE 104 may communicate via a communication link 110, which may be a wireless or wired connection. For example, a network entity 102 and a UE 104 may perform wireless communication (e.g., receive signaling, transmit signaling) over a Uu interface.

A network entity 102 may provide a geographic coverage area 112 for which the network entity 102 may support services (e.g., voice, video, packet data, messaging, broadcast, etc.) for one or more UEs 104 within the geographic coverage area 112. For example, a network entity 102 and a UE 104 may support wireless communication of signals related to services (e.g., voice, video, packet data, messaging, broadcast, etc.) according to one or multiple radio access technologies. In some implementations, a network entity 102 may be moveable, for example, a satellite associated with a non-terrestrial network. In some implementations, different geographic coverage areas 112 associated with the same or different radio access technologies may overlap, but the different geographic coverage areas 112 may be associated with different network entities 102. Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The one or more UEs 104 may be dispersed throughout a geographic region of the wireless communications system 100. A UE 104 may include or may be referred to as a mobile device, a wireless device, a remote device, a remote unit, a handheld device, or a subscriber device, or some other suitable terminology. In some implementations, the UE 104 may be referred to as a unit, a station, a terminal, or a client, among other examples. Additionally, or alternatively, the UE 104 may be referred to as an Internet-of-Things (IOT) device, an Internet-of-Everything (IoE) device, or machine-type communication (MTC) device, among other examples. In some implementations, a UE 104 may be stationary in the wireless communications system 100. In some other implementations, a UE 104 may be mobile in the wireless communications system 100.

The one or more UEs 104 may be devices in different forms or having different capabilities. Some examples of UEs 104 are illustrated in FIG. 1. A UE 104 may be capable of communicating with various types of devices, such as the network entities 102, other UEs 104, or network equipment (e.g., the core network 106, the packet data network 108, a relay device, an integrated access and backhaul (IAB) node, or another network equipment), as shown in FIG. 1. Additionally, or alternatively, a UE 104 may support communication with other network entities 102 or UEs 104, which may act as relays in the wireless communications system 100.

A UE 104 may also be able to support wireless communication directly with other UEs 104 over a communication link 114. For example, a UE 104 may support wireless communication directly with another UE 104 over a device-to-device (D2D) communication link. In some implementations, such as vehicle-to-vehicle (V2V) deployments, vehicle-to-everything (V2X) deployments, or cellular-V2X deployments, the communication link 114 may be referred to as a sidelink. For example, a UE 104 may support wireless communication directly with another UE 104 over a PC5 interface.

A network entity 102 may support communications with the core network 106, or with another network entity 102, or both. For example, a network entity 102 may interface with the core network 106 through one or more backhaul links 116 (e.g., via an S1, N2, N2, or another network interface). The network entities 102 may communicate with each other over the backhaul links 116 (e.g., via an X2, Xn, or another network interface). In some implementations, the network entities 102 may communicate with each other directly (e.g., between the network entities 102). In some other implementations, the network entities 102 may communicate with each other or indirectly (e.g., via the core network 106). In some implementations, one or more network entities 102 may include subcomponents, such as an access network entity, which may be an example of an access node controller (ANC). An ANC may communicate with the one or more UEs 104 through one or more other access network transmission entities, which may be referred to as a radio heads, smart radio heads, or transmission-reception points (TRPs).

In some implementations, a network entity 102 may be configured in a disaggregated architecture, which may be configured to utilize a protocol stack physically or logically distributed among two or more network entities 102, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 102 may include one or more of a central unit (CU), a distributed unit (DU), a radio unit (RU), a RAN Intelligent Controller (RIC) (e.g., a Near-Real Time RIC (Near-RT RIC), a Non-Real Time RIC (Non-RT RIC)), a Service Management and Orchestration (SMO) system, or any combination thereof.

An RU may also be referred to as a radio head, a smart radio head, a remote radio head (RRH), a remote radio unit (RRU), or a transmission reception point (TRP). One or more components of the network entities 102 in a disaggregated RAN architecture may be co-located, or one or more components of the network entities 102 may be located in distributed locations (e.g., separate physical locations). In some implementations, one or more network entities 102 of a disaggregated RAN architecture may be implemented as virtual units (e.g., a virtual CU (VCU), a virtual DU (VDU), a virtual RU (VRU)).

Split of functionality between a CU, a DU, and an RU may be flexible and may support different functionalities depending upon which functions (e.g., network layer functions, protocol layer functions, baseband functions, radio frequency functions, and any combinations thereof) are performed at a CU, a DU, or an RU. For example, a functional split of a protocol stack may be employed between a CU and a DU such that the CU may support one or more layers of the protocol stack and the DU may support one or more different layers of the protocol stack. In some implementations, the CU may host upper protocol layer (e.g., a layer 3 (L3), a layer 2 (L2)) functionality and signaling (e.g., Radio Resource Control (RRC), service data adaption protocol (SDAP), Packet Data Convergence Protocol (PDCP)). The CU may be connected to one or more DUs or RUs, and the one or more DUs or RUs may host lower protocol layers, such as a layer 1 (L1) (e.g., physical (PHY) layer) or an L2 (e.g., radio link control (RLC) layer, medium access control (MAC) layer) functionality and signaling, and may each be at least partially controlled by the CU.

Additionally, or alternatively, a functional split of the protocol stack may be employed between a DU and an RU such that the DU may support one or more layers of the protocol stack and the RU may support one or more different layers of the protocol stack. The DU may support one or multiple different cells (e.g., via one or more RUs). In some implementations, a functional split between a CU and a DU, or between a DU and an RU may be within a protocol layer (e.g., some functions for a protocol layer may be performed by one of a CU, a DU, or an RU, while other functions of the protocol layer are performed by a different one of the CU, the DU, or the RU).

A CU may be functionally split further into CU control plane (CU-CP) and CU user plane (CU-UP) functions. A CU may be connected to one or more DUs via a midhaul communication link (e.g., F1, F1-c, F1-u), and a DU may be connected to one or more RUs via a fronthaul communication link (e.g., open fronthaul (FH) interface). In some implementations, a midhaul communication link or a fronthaul communication link may be implemented in accordance with an interface (e.g., a channel) between layers of a protocol stack supported by respective network entities 102 that are in communication via such communication links.

The core network 106 may support user authentication, access authorization, tracking, connectivity, and other access, routing, or mobility functions. The core network 106 may be an evolved packet core (EPC), or a 5G core (5GC), which may include a control plane entity that manages access and mobility (e.g., a mobility management entity (MME), an access and mobility management functions (AMF)) and a user plane entity that routes packets or interconnects to external networks (e.g., a serving gateway (S-GW), a Packet Data Network (PDN) gateway (P-GW), or a user plane function (UPF)). In some implementations, the control plane entity may manage non-access stratum (NAS) functions, such as mobility, authentication, and bearer management (e.g., data bearers, signal bearers, etc.) for the one or more UEs 104 served by the one or more network entities 102 associated with the core network 106.

The core network 106 may communicate with the packet data network 108 over one or more backhaul links 116 (e.g., via an S1, N2, N2, or another network interface). The packet data network 108 may include an application server 118. In some implementations, one or more UEs 104 may communicate with the application server 118. A UE 104 may establish a session (e.g., a protocol data unit (PDU) session, or the like) with the core network 106 via a network entity 102. The core network 106 may route traffic (e.g., control information, data, and the like) between the UE 104 and the application server 118 using the established session (e.g., the established PDU session). The PDU session may be an example of a logical connection between the UE 104 and the core network 106 (e.g., one or more network functions of the core network 106).

In the wireless communications system 100, the network entities 102 and the UEs 104 may use resources of the wireless communication system 100 (e.g., time resources (e.g., symbols, slots, subframes, frames, or the like) or frequency resources (e.g., subcarriers, carriers) to perform various operations (e.g., wireless communications). In some implementations, the network entities 102 and the UEs 104 may support different resource structures. For example, the network entities 102 and the UEs 104 may support different frame structures. In some implementations, such as in 4G, the network entities 102 and the UEs 104 may support a single frame structure. In some other implementations, such as in 5G and among other suitable radio access technologies, the network entities 102 and the UEs 104 may support various frame structures (i.e., multiple frame structures). The network entities 102 and the UEs 104 may support various frame structures based on one or more numerologies.

One or more numerologies may be supported in the wireless communications system 100, and a numerology may include a subcarrier spacing and a cyclic prefix. A first numerology (e.g., $\mu=0$) may be associated with a first subcarrier spacing (e.g., 15 kHz) and a normal cyclic prefix. The first numerology (e.g., $\mu=0$) associated with the first subcarrier spacing (e.g., 15 kHz) may utilize one slot per subframe. A second numerology (e.g., $\mu=1$) may be associated with a second subcarrier spacing (e.g., 30 kHz) and a normal cyclic prefix. A third numerology (e.g., $\mu=2$) may be associated with a third subcarrier spacing (e.g., 60 kHz) and a normal cyclic prefix or an extended cyclic prefix. A fourth numerology (e.g., $\mu=3$) may be associated with a fourth subcarrier spacing (e.g., 120 kHz) and a normal cyclic prefix. A fifth numerology (e.g., $\mu=4$) may be associated with a fifth subcarrier spacing (e.g., 240 kHz) and a normal cyclic prefix.

A time interval of a resource (e.g., a communication resource) may be organized according to frames (also referred to as radio frames). Each frame may have a duration, for example, a 10 millisecond (ms) duration. In some implementations, each frame may include multiple subframes. For example, each frame may include 10 subframes, and each subframe may have a duration, for example, a 1 ms duration. In some implementations, each frame may have the same duration. In some implementations, each subframe of a frame may have the same duration.

Additionally or alternatively, a time interval of a resource (e.g., a communication resource) may be organized according to slots. For example, a subframe may include a number (e.g., quantity) of slots. Each slot may include a number (e.g., quantity) of symbols (e.g., orthogonal frequency division multiplexing (OFDM) symbols). In some implementations, the number (e.g., quantity) of slots for a subframe may depend on a numerology. For a normal cyclic prefix, a slot may include 14 symbols. For an extended cyclic prefix (e.g., applicable for 60 kHz subcarrier spacing), a slot may include 12 symbols. The relationship between the number of symbols per slot, the number of slots per subframe, and the number of slots per frame for a normal cyclic prefix and an extended cyclic prefix may depend on a numerology. It should be understood that reference to a first numerology (e.g., μ=0) associated with a first subcarrier spacing (e.g., 15 kHz) may be used interchangeably between subframes and slots.

In the wireless communications system 100, an electromagnetic (EM) spectrum may be split, based on frequency or wavelength, into various classes, frequency bands, frequency channels, etc. By way of example, the wireless communications system 100 may support one or multiple operating frequency bands, such as frequency range designations FR1 (410 MHz-7.125 GHZ), FR2 (24.25 GHz-52.6 GHZ), FR3 (7.125 GHz-24.25 GHz), FR4 (52.6 GHz-114.25 GHz), FR4a or FR4-1 (52.6 GHz-71 GHZ), and FR5 (114.25 GHz-300 GHz). In some implementations, the network entities 102 and the UEs 104 may perform wireless communications over one or more of the operating frequency bands. In some implementations, FR1 may be used by the network entities 102 and the UEs 104, among other equipment or devices for cellular communications traffic (e.g., control information, data). In some implementations, FR2 may be used by the network entities 102 and the UEs 104, among other equipment or devices for short-range, high data rate capabilities.

FR1 may be associated with one or multiple numerologies (e.g., at least three numerologies). For example, FR1 may be associated with a first numerology (e.g., μ=0), which includes 15 kHz subcarrier spacing; a second numerology (e.g., μ=1), which includes 30 kHz subcarrier spacing; and a third numerology (e.g., μ=2), which includes 60 kHz subcarrier spacing. FR2 may be associated with one or multiple numerologies (e.g., at least 2 numerologies). For example, FR2 may be associated with a third numerology (e.g., μ=2), which includes 60 kHz subcarrier spacing; and a fourth numerology (e.g., μ=3), which includes 120 kHz subcarrier spacing.

The core network 106 includes an NWDAF containing a MTLF 120, an NWDAF containing an AnLF 122, an ADRF 124, and an NRF 126. In one or more implementations, a single device or apparatus may implement two or more of the NWDAF containing the MTLF 120, the NWDAF containing the AnLF 122, the ADRF 124, and the NRF 126. Additionally or alternatively, each of the MTLF 120, the NWDAF containing the AnLF, the ADRF 124, and the NRF 126 are implemented on separate devices or apparatuses. NWDAF containing the MTLF 120 generates a security context (e.g., an encryption key and an integrity protection key) that protects an ML model that is stored in the ADRF 124. When the NWDAF containing the AnLF 122 desires to use the ML model, the NWDAF containing the AnLF 122 obtains the protected ML model from the ADRF 124 and obtains the security context from the NWDAF containing the MTLF 120, allowing the NWDAF containing the AnLF 122 to use the ML model (e.g., decrypt the protected ML model). The security context is managed using one or both of a storage duration time that indicates when the ADRF 124 is to delete the protected ML and the NWDAF containing the MTLF 120 is to delete the security context, and a validity time that indicates when the ADRF 124 is to delete the protected ML and the NWDAF containing the MTLF 120 is to delete the security context.

The techniques discussed herein describe the provisioning of validity time to the NWDAF containing MTLF 120. In one or more implementations, the ADRF 124 provides a storage duration to the NWDAF containing MTLF 120, and the security context and the protected ML model are deleted after the expiration of the storage duration. Additionally or alternatively, the NWDAF containing MTLF 120 provides a validity time for the security context to the ADRF 124, and the security context and the protected ML model are deleted after the expiration of the validity time. Additionally or alternatively, after the expiration of the validity time of the security context, the security context and the protected ML model are deleted, a new security context is generated, and the ML model is protected (e.g., encrypted) with the new keys in the new security context, and the ML model (protected using the new security context) is stored again in the ADRF 124.

The ML model is any of a variety of different ML systems that use algorithms to learn to generate outputs based on input data. Such ML systems are typically trained based on various input data and effectively learn the outputs based on the input training data. Examples of machine learning system include neural networks such as multilayer neural networks (e.g., a convolutional neural network (CNN)), classification systems, regression systems, forecasting systems, clustering systems, dimension reduction systems, and so forth.

Figure 2A:
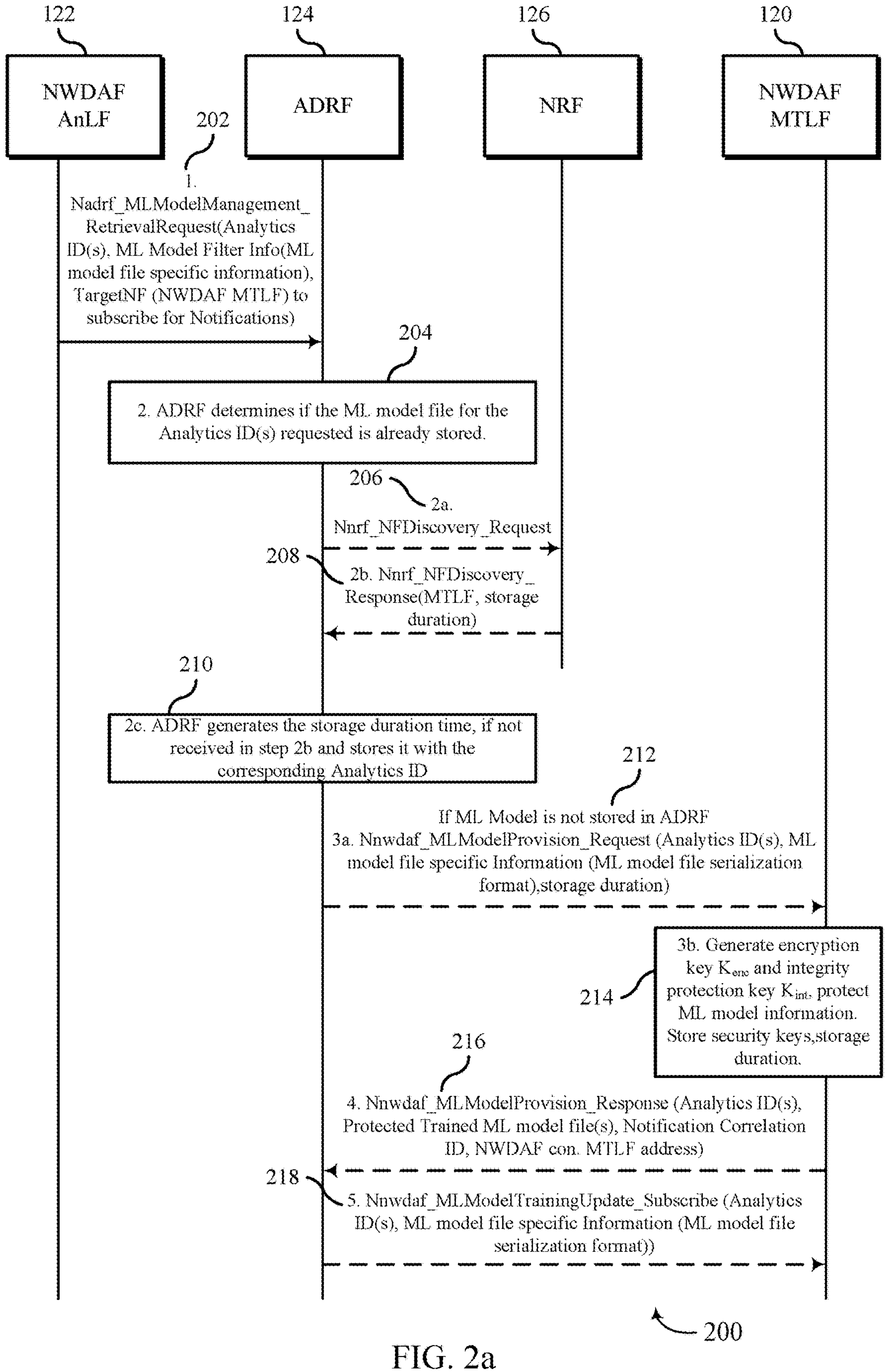
FIGS. 2*a*, 2*b*, and 2*c* illustrate an example signaling flow that supports key management for machine learning models in accordance with aspects of the present disclosure.
Figure 2B:
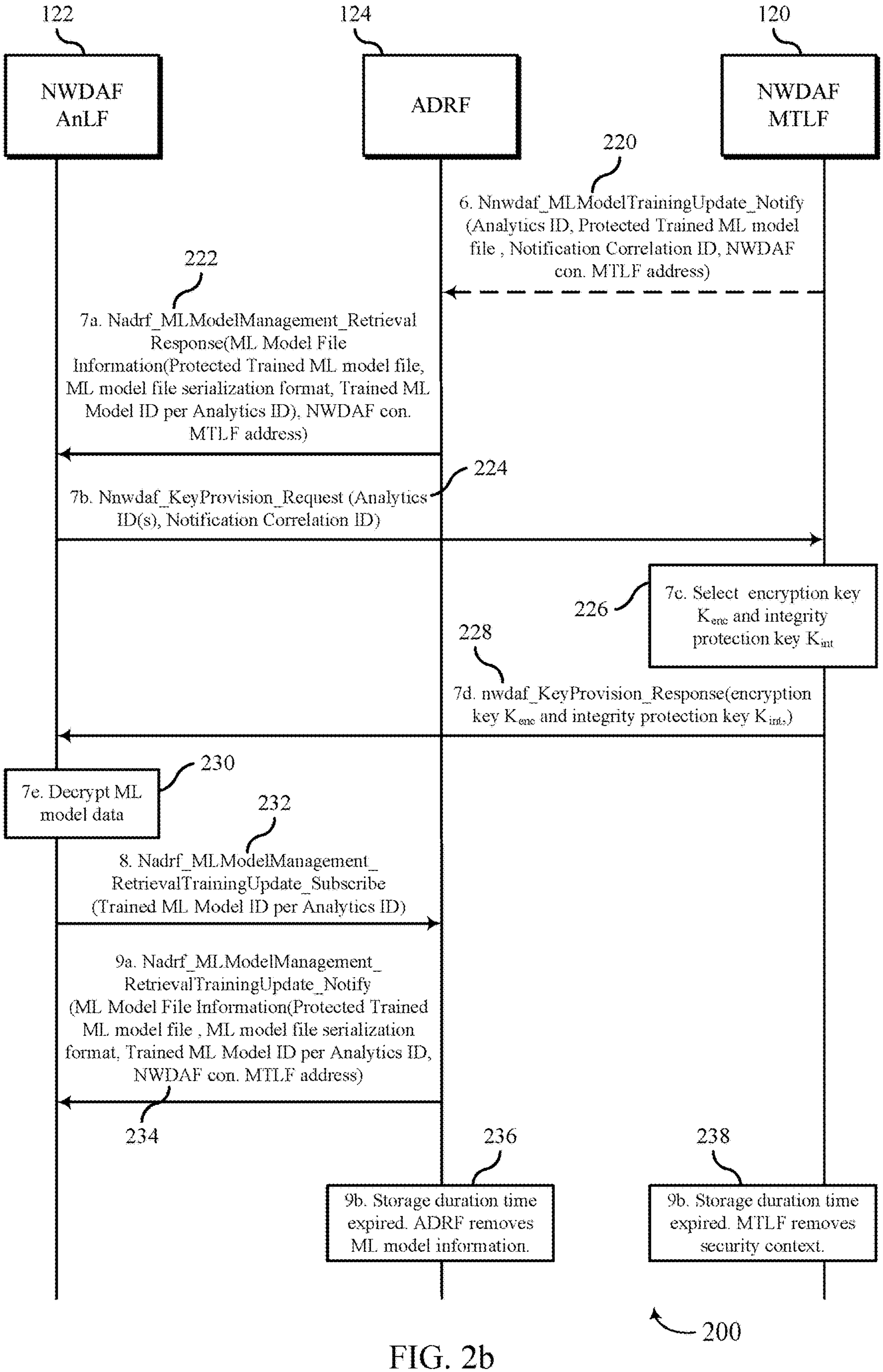
Figure 2C:
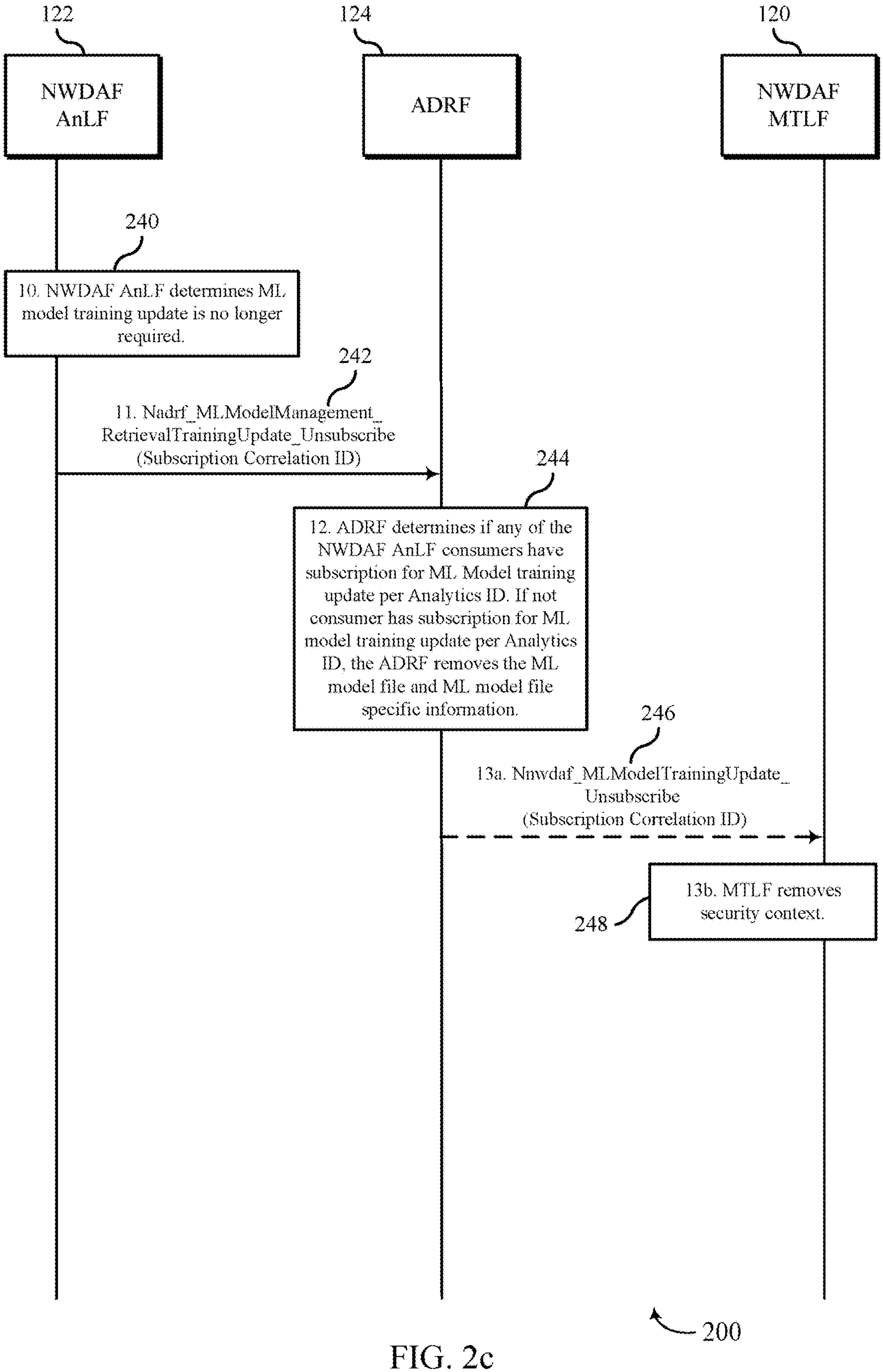

FIGS. 2*a*, 2*b*, and 2*c* illustrate an example signaling flow 200 that supports key management for machine learning models in accordance with aspects of the present disclosure.

The data producer (the NWDAF containing MTLF 120) is generating a security context to protect the ML model information, which is then stored protected in the ADRF 124 with the data producer identity so that network function (NF) consumers (e.g., NWDAF containing AnLF 122), if authorized, can request the protected ML model information from the ADRF 124 as well as the security context from the data producer to unprotect the ML model information for further processing.

At 202, the NWDAF containing AnLF 202 sends a request (e.g., an Nadrf_MLModelManagement_RetrievalRequest) which includes analytics identifier(s) (ID(s)), ML model filter information (e.g., ML model file specific information), optionally target NF (e.g., NWDAF containing MTLF 120) to subscribe for notifications. The ML model file specific information includes the ML model file serialization format requested by the NWDAF containing AnLF 122.

At 204, the ADRF 124 determines if the ML model file for the analytics ID(s) requested is already stored at the ADRF 124. If the ML model file for the analytics ID(s) requested is not stored in the ADRF 124, then the actions at 212, 214, 216, 218, and 220 discussed below are performed. However, before the actions at 212-220 are performed, if the ADRF 124 is not informed of the target MTLF from the NWDAF containing the AnLF 122, the ADRF 124 discovers the target MTLF from the NRF 126 by sending, at 206, a discovery request to the NRF 126 and receiving from the NRF 126 in response, at 208, a discovery response that includes the target MTLF and a storage duration. At 210, the ADRF 124 stores the storage duration along with the corresponding analytics ID(s). Additionally or alternatively, the storage duration is not obtained form the NRF 126. In such situations, at 210 the ADRF 124 generates the storage duration. The storage duration can be specified in any of various manners, such as a specific time (e.g., a particular time on a particular day, such as 2:12 pm Greenwich Mean Time (GMT) on Apr. 1, 2022), a remaining amount of time after some occurrence, event, or signaling (e.g., 2 hours after the storage duration is generated, 3 hours after a provisioning response is received at 216 below), and so forth.

If the ML model file for the analytics ID(s) requested is in stored in the ADRF 124, then the actions at 212, 214, 216, 218, and 220 are skipped.

At 212, the ADRF 124 sends a request to provision a ML model (e.g., a Nnwdaf_MLModelProvision_Request) with the input parameters defined in 3rd generation partnership project (3GGP) technical specification (TS) 23.288 and additional input parameters ML model file specific information (ML model file serialization format) and storage duration time. The storage duration time indicates when the ADRF 124 deletes the ML model information in the repository. The storage duration time can be preconfigured or, e.g., provisioned by the NRF 126 during target MTLF discovery. The storage duration time also indicates when the NWDAF containing MTLF 120 shall remove the security context.

At 214, the NWDAF containing MTLF 120 generates a security context for protecting the ML model information. The security context is per ML model and gets removed once the ML model information is removed from the ADRF 124. The security context consists of an encryption key $K_{enc}$ and an integrity key $K_{int}$ (also referred to as an integrity protection key) as well as the corresponding security algorithm(s) for encryption and integrity protection. The NWDAF containing MTLF 120 uses the encryption key $K_{enc}$ and integrity key $K_{int}$ to protect the ML model and related information. The MTLF 120 stores the security context and the related ML information for identification of the security context. The NWDAF containing the MTLF 120 can use any of a variety of public or proprietary encryption or integrity protection techniques to protect the ML model and related information.

At 216, the NWDAF containing MTLF 120 sends a provisioning response (e.g., Nnwdaf_MLModelProvision_Response) with the following parameters: Analytics ID(s), Protected Trained ML model file(s), and NWDAF containing MTLF 120 identity.

At 218, the ADRF 124 sends a request to update the training of the ML model (e.g., Nnwdaf_MLModelTrainingUpdate_Subscribe) to the NWDAF containing the MTLF 120 with the input parameters Analytics ID(s), ML model file specific information (ML model file serialization format).

At 220, when the ML model for which the ADRF 124 has subscribed for ML model training update has been updated (e.g., the ML model has been re-trained or further trained, such as using new or additional training data), the NWDAF containing MTLF 120 sends an update response (e.g., Nnwdaf_MLModelTrainingUpdate_Notify) with the following parameters: Analytics ID, Protected Trained ML model(s) file, Notification Correlation ID, and NWDAF containing MTLF 120 Identity.

At 222, the ADRF 124 sends a response back to the NWDAF containing AnLF 122 using a retrieval response (e.g., Nadrf_MLModelManagement_Retrieval Response) with the following parameters: Protected ML Model File Information (Trained ML model(s) file, ML model file serialization format, Trained ML Model ID per Analytics ID, NWDAF containing MTLF 120 address).

At 224, the NWDAF containing AnLF 122 sends a key provisioning request (e.g., Nnwdaf_KeyProvision_Request) to the NWDAF containing MTLF 120 with the input parameters Analytics ID(s) and Notification Correlation ID. The NWDAF containing AnLF 122 is authorized by the NRF 126 to contact the NWDAF containing MTLF 120 and to retrieve the security context. Note that in signaling flow 200 it is assumed that NWDAF containing AnLF 122 authorization has already been performed.

At 226, the NWDAF containing MTLF 120 selects the ML model security context based on the related ML information for identification.

At 228, the NWDAF containing MTLF 120 sends a key provisioning response (e.g., Nnwdaf_KeyProvision_Response) to the NWDAF containing AnLF 122, including the ML model security context. It is assumed that the message is protected, such as with service-based architecture (SBA) security or network domain security/Internet protocol (NDS/IP).

At 230, the NWDAF containing AnLF 122 unprotects the ML model data with the received security context.

At 232, the NWDAF containing AnLF 122 subscribes to ADRF 124 using a subscription request (e.g., a Nadrf_MLModelManagement_RetrievalTrainingUpdate_Subscribe service operation) containing input parameters Trained ML Model ID per Analytics ID.

At 234, the ADRF 124 sends a notification to the NWDAF containing AnLF 122 using an update notification (e.g., a Nadrf_MLModelManagement_RetrievalTrainingUpdate_Notify service operation) containing the following parameters: ML Model File Information (Protected Trained ML model(s) file, ML model file serialization format, Trained ML Model ID per Analytics ID, NWDAF containing MTLF 120 Identity).

At 236, the storage duration time is expired, the ADRF 124 removes (e.g., deletes) the ML model information and at 238 the NWDAF containing MTLF 120 removes (e.g., deletes) the security context. In one or more implementations, the ML model information and the security context are removed (e.g., deleted) in response to the storage duration time expiring or a particular amount of time after the storage duration time expires (e.g., 30 seconds or 5 minutes).

At 240, NWDAF containing AnLF 122 determines that the ML model training update is no longer required.

At 242, the NWDAF containing AnLF 122 sends an unsubscribe request (e.g., N_MLModelManagement_RetrievalTrainingUpdate_Unsubscribe) with Subscription Correlation ID as input parameters.

At 244, the ADRF 124 determines if any of the NF consumer(s) have subscription for ML Model training update per Analytics ID. If none of the NF consumer(s) have subscription for ML model training update per Analytics ID, the ADRF 124 removes the Protected ML model file and ML model file specific information and proceeds to remove (e.g., delete) the ML model information.

At 246, the ADRF 124 sends an unsubscribe request (e.g., Nnwdaf_MLModelTrainingUpdate_Unsubscribe) to the NWDAF containing the MTLF 120 with the Subscription Correlation ID as input parameter.

At 248, in response to the request at 246, the NWDAF containing MTLF 120 removes (e.g., deletes) the security context for the ML model.

Figure 3A:
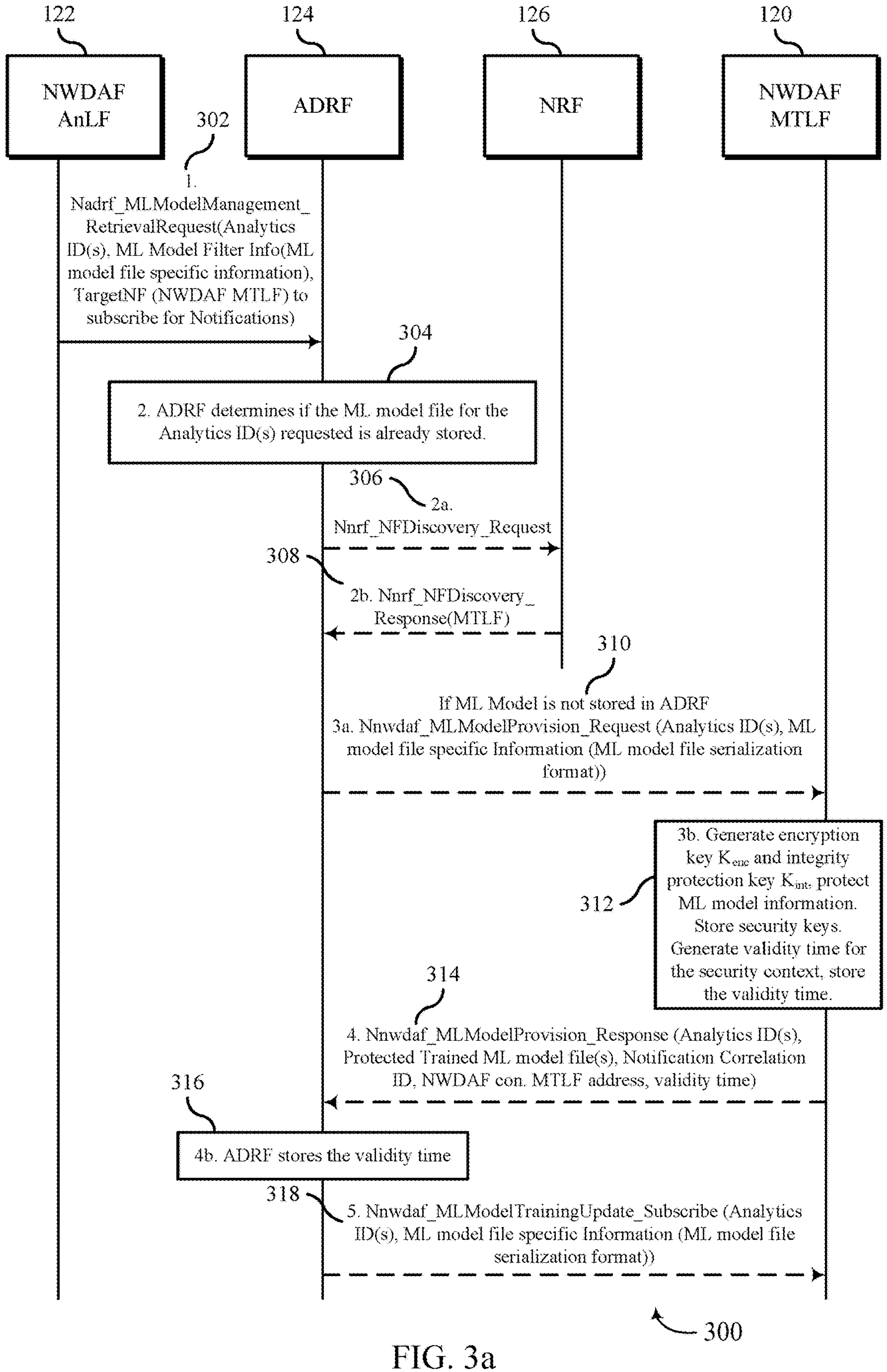
FIGS. 3*a*, 3*b*, and 3*c* illustrate another example signaling flow that supports key management for machine learning models in accordance with aspects of the present disclosure.
Figure 3B:
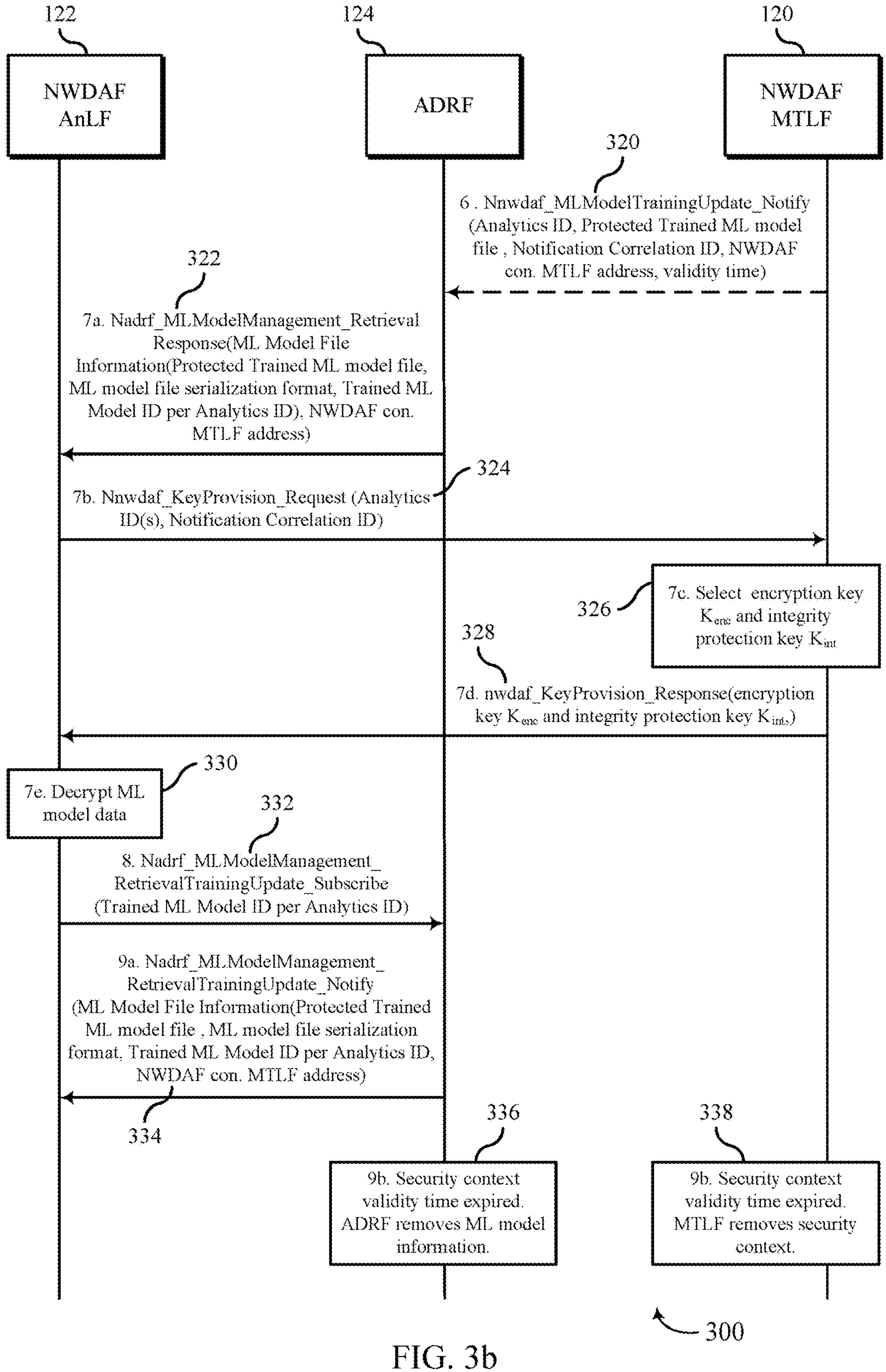
Figure 3C:
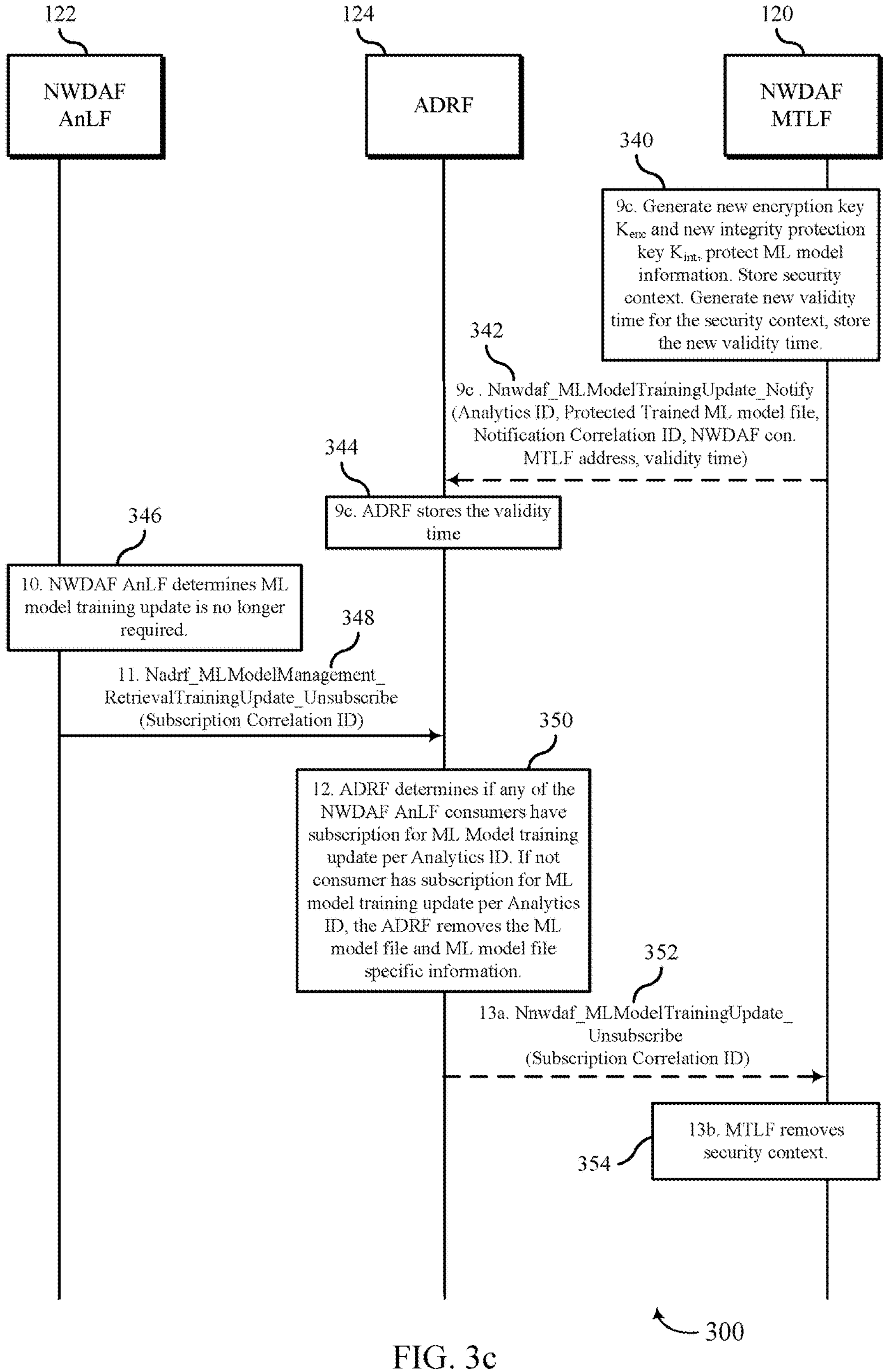

FIGS. 3*a*, 3*b*, and 3*c* illustrate an example signaling flow 300 that supports key management for machine learning models in accordance with aspects of the present disclosure.

The data producer (the NWDAF containing MTLF 120) is generating a security context to protect the ML model information, which is then stored protected in the ADRF 124 with the data producer identity so that network function (NF) consumers (e.g., NWDAF containing AnLF 122), if authorized, can request the protected ML model information from the ADRF 124 as well as the security context from the data producer to unprotect the ML model information for further processing.

At 302, the NWDAF containing AnLF 202 sends a request (e.g., an Nadrf_MLModelManagement_Retrieval-Request) which includes analytics identifier(s) (ID(s)), ML model filter information (e.g., ML model file specific information), optionally target NF (e.g., NWDAF containing MTLF 120) to subscribe for notifications. The ML model file specific information includes the ML model file serialization format requested by the NWDAF containing AnLF 122.

At 304, the ADRF 124 determines if the ML model file for the analytics ID(s) requested is already stored at the ADRF 124. If the ML model file for the analytics ID(s) requested is not stored in the ADRF 124, then the actions at 310, 312, 314, 316, 318, and 320 discussed below are performed. However, before the actions at 310-320 are performed, if the ADRF 124 is not informed of the target MTLF from the NWDAF containing the AnLF 122, the ADRF 124 discovers the target MTLF from the NRF 126 by sending, at 306, a discovery request to the NRF 126 and receiving from the NRF 126 in response, at 308, a discovery response that includes the target MTLF.

If the ML model file for the analytics ID(s) requested is in stored in the ADRF 124, then the actions at 310, 312, 314, 316, 318, and 320 are skipped.

At 310, the ADRF 124 sends a request to provision a ML model (e.g., a Nnwdaf_MLModelProvision_Request) with the input parameters defined in 3rd generation partnership project (3GGP) technical specification (TS) 23.288 and additional input parameter ML model file specific information (ML model file serialization format).

At 312, the NWDAF containing MTLF 120 generates a security context for protecting the ML model information. The security context is per ML model and gets removed once the ML model information is removed from the ADRF 124. The NWDAF containing MTLF 120 also generates a validity time for the security context. The security context consists of an encryption key $K_{enc}$ and an integrity key $K_{int}$ as well as the corresponding security algorithm(s) for encryption and integrity protection. The NWDAF containing MTLF 120 uses the encryption key $K_{enc}$ and integrity key $K_{int}$ to protect the ML model and related information. The MTLF 120 stores the security context and the related ML information for identification of the security context. The NWDAF containing the MTLF 120 can use any of a variety of public or proprietary encryption or integrity protection techniques to protect the ML model and related information.

The validity time can be specified in any of various manners, such as a specific time (e.g., a particular time on a particular day, such as 2:12 pm Greenwich Mean Time (GMT) on Apr. 1, 2022), a remaining amount of time after some occurrence, event, or signaling (e.g., 2 hours after the validity time is generated, 3 hours after a provisioning response is received at 216 below), and so forth.

At 314, the NWDAF containing MTLF 120 sends a provisioning response (e.g., Nnwdaf_MLModelProvision_Response) with the following parameters: Analytics ID(s), Protected Trained ML model file(s), NWDAF containing MTLF 120 identity, and validity time for the security context. The validity time indicates to the ADRF 124 when to remove (e.g., delete) the protected ML model information.

At 316, the ADRF 124 stores the validity time.

At 318, the ADRF 124 sends a request to update the training of the ML model (e.g., Nnwdaf_MLModelTrainingUpdate_Subscribe) to the NWDAF containing the MTLF 120 with the input parameters Analytics ID(s), ML model file specific information (ML model file serialization format).

At 320, when the ML model for which the ADRF 124 has subscribed for ML model training update has been updated (e.g., the ML model has been re-trained or further trained, such as using new or additional training data), the NWDAF containing MTLF 120 sends an update response (e.g., Nnwdaf_MLModelTrainingUpdate_Notify) with the following parameters: Analytics ID, Protected Trained ML model(s) file, Notification Correlation ID, NWDAF containing MTLF 120 Identity, and validity time for the security context.

At 322, the ADRF 124 sends a response back to the NWDAF containing AnLF 122 using a retrieval response (e.g., Nadrf_MLModelManagement_Retrieval Response) with the following parameters: Protected ML Model File Information (Trained ML model(s) file, ML model file serialization format, Trained ML Model ID per Analytics ID, NWDAF containing MTLF 120 address).

At 324, the NWDAF containing AnLF 122 sends a key provisioning request (e.g., Nnwdaf_KeyProvision_Request) to the NWDAF containing MTLF 120 with the input parameters Analytics ID(s) and Notification Correlation ID. The NWDAF containing AnLF 122 is authorized by the NRF 126 to contact the NWDAF containing MTLF 120 and to retrieve the security context. Note that in signaling flow 200 it is assumed that NWDAF containing AnLF 122 authorization has already been performed.

At 326, the NWDAF containing MTLF 120 selects the ML model security context based on the related ML information for identification.

At 328, the NWDAF containing MTLF 120 sends a key provisioning response (e.g., Nnwdaf_KeyProvision_Response) to the NWDAF containing AnLF 122, including the ML model security context. It is assumed that the message is protected, such as with service-based architecture (SBA) security or network domain security/Internet protocol (NDS/IP).

At 330, the NWDAF containing AnLF 122 unprotects the ML model data with the received security context.

At 332, the NWDAF containing AnLF 122 subscribes to ADRF 124 using a subscription request (e.g., a Nadrf_MLModelManagement_RetrievalTrainingUpdate_Subscribe service operation) containing input parameters Trained ML Model ID per Analytics ID.

At 334, the ADRF 124 sends a notification to the NWDAF containing AnLF 122 using an update notification (e.g., a Nadrf_MLModelManagement_RetrievalTrainingUpdate_Notify service operation) containing the following parameters: ML Model File Information (Protected Trained ML model(s) file, ML model file serialization format, Trained ML Model ID per Analytics ID, NWDAF containing MTLF 120 Identity).

At 336, the validity time for the security context is expired, the ADRF removes (e.g., deletes) the ML model information and at 338 the NWDAF containing MTLF 120 removes (e.g., deletes) the security context. In one or more implementations, the ML model information and the security context are removed (e.g., deleted) in response to the validity time expiring or a particular amount of time after the storage duration time expires (e.g., 30 seconds or 5 minutes).

At 340, when the validity time for the security context is expired, the ADRF 124 removes the ML model information and the NWDAF containing MTLF 120 removes the security context. If the storage duration time is available and still valid, or, the ADRF 124 did not send an Unsubscribe to the NWDAF containing MTLF 120 (as at 248 discussed below), then the NWDAF containing MTLF 120 generates a new security context for protecting the ML model information similar as at 312. The NWDAF containing MTLF 120 generates a validity time for the security context. The security context consists of an encryption key $K_{enc}$ and an integrity key $K_{int}$ as well as the corresponding security algorithm(s) for encryption and integrity protection. The NWDAF containing MTLF 120 uses the encryption key $K_{enc}$ and integrity key $K_{int}$ to protect the ML model and related information. The MTLF 120 stores the security context and the related ML information for identification of the security context. The NWDAF containing MTLF 120 then sends an update notification to the ADRF 124 with the new protected ML model and the new validity time. The ADRF 124 stores the ML model information and the validity time.

At 342, when the ML model for which the ADRF 124 has subscribed for ML model training update has been updated (e.g., the ML model has been re-trained or further trained, such as using new or additional training data), the NWDAF containing MTLF 120 sends an update response (e.g., Nnwdaf_MLModelTrainingUpdate_Notify) with the following parameters: Analytics ID, Protected Trained ML model(s) file, Notification Correlation ID, and NWDAF containing MTLF 120 Identity, and validity time for the security context. This validity time for the security content is, for example, the validity time for the new security context generated at 340.

At 344, the ADRF 124 stores the validity time received at 342.

At 346, NWDAF containing AnLF 122 determines that the ML model training update is no longer required.

At 348, the NWDAF containing AnLF 122 sends an unsubscribe request (e.g., N_MLModelManagement_RetrievalTrainingUpdate_Unsubscribe) with Subscription Correlation ID as input parameters.

At 350, the ADRF 124 determines if any of the NF consumer(s) have subscription for ML Model training update per Analytics ID. If none of the NF consumer(s) have subscription for ML model training update per Analytics ID, the ADRF 124 removes the Protected ML model file and ML model file specific information and proceeds to remove (e.g., delete) the ML model information.

At 352, the ADRF 124 sends an unsubscribe request (e.g., Nnwdaf_MLModelTrainingUpdate_Unsubscribe) to the NWDAF containing the MTLF 120 with the Subscription Correlation ID as input parameter.

At 354, in response to the request at 246, the NWDAF containing MTLF 120 removes (e.g., deletes) the security context for the ML model.

It should be noted that signaling flows 200 and 300 may optionally be used together, allowing the management of keys for an ML model to include both a storage duration and a validity time.

Figure 4:
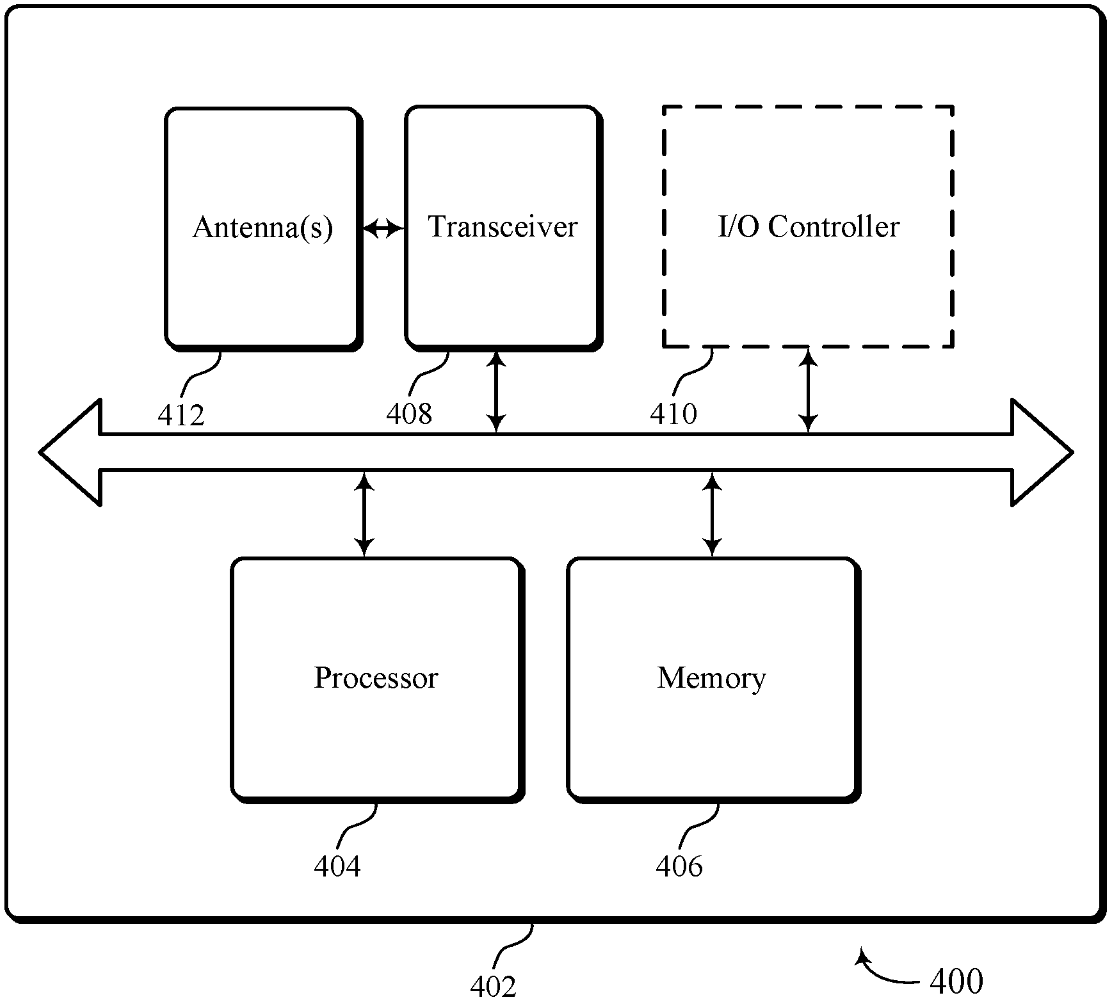
FIGS. 4 and 5 illustrate examples of block diagrams of devices that support key management for machine learning models in accordance with aspects of the present disclosure.

FIG. 4 illustrates an example of a block diagram 400 of a device 402 that supports key management for machine learning models in accordance with aspects of the present disclosure. The device 402 may be an example of a device in the core network 106, such as a device implementing an ADRF 124 as described herein. The device 402 may support wireless communication with one or more network entities 102, UEs 104, or any combination thereof. The device 402 may include components for bi-directional communications including components for transmitting and receiving communications, such as a processor 404, a memory 406, a transceiver 408, and an I/O controller 410. These components may be in electronic communication or otherwise coupled (e.g., operatively, communicatively, functionally, electronically, electrically) via one or more interfaces (e.g., buses).

The processor 404, the memory 406, the transceiver 408, or various combinations thereof or various components thereof may be examples of means for performing various aspects of the present disclosure as described herein. For example, the processor 404, the memory 406, the transceiver 408, or various combinations or components thereof may support a method for performing one or more of the operations described herein.

In some implementations, the processor 404, the memory 406, the transceiver 408, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some implementations, the processor 404 and the memory 406 coupled with the processor 404 may be configured to perform one or more of the functions described herein (e.g., executing, by the processor 404, instructions stored in the memory 406).

Processor 404 may be configured as or otherwise support to: transmit, to a NWDAF containing a MTLF, a first signaling indicating a request to provision a ML model; receive, from the NWDAF containing the MTLF, a second signaling indicating a first protected ML model that has been protected using a first security context; store at least one of a first validity time for the first security context and a first storage duration for the first protected ML model; and delete the protected ML model in response to the first the first validity time expiring or the first storage duration expiring.

Additionally or alternatively, the processor 404 may be configured to or otherwise support: where the second signaling further indicates the first validity time; where the second signaling further indicates the first validity time, and the processor is further configured to: store the validity time for the first security context; where the processor is further configured to: transmit, to the NWDAF containing the MTLF, a third signaling indicating a request to update training of the ML model; and receive, from the NWDAF containing the MTLF, a fourth signaling indicating a second protected ML model and a second validity time for a second security context for the second protected ML; where the processor is further configured to: receive, from the NWDAF containing the MTLF, a third signaling indicating a second validity time and a second protected ML model that has been protected using a second security context; and store the second validity time and the second protected ML; where the processor is further configured to: receive, from the NWDAF containing the MTLF in response to the first validity time for the first security context having expired but the first storage duration time for the first protected ML not having expired, a third signaling indicating a second validity time and a second protected ML model that has been protected using a second security context; and store the second validity time and the second protected ML; where the processor is further configured to: transmit, to a NRF, a third signaling indicating a discovery request for the NWDAF containing the MTLF; receive, from the NRF, a fourth signaling indicating the first storage duration and the NWDAF containing the MTLF; and store the first storage duration with an analytics identifier of an NWDAF containing an AnLF; where the processor is further configured to: generate the first storage duration; and store the first storage duration with an analytics identifier of a NWDAF containing an AnLF; where the processor is further configured to transmit, to the NWDAF containing the MTLF, a third signaling indicating the storage duration; where the first security context comprises an encryption key and an integrity protection key.

For example, the processor 404 may support wireless communication at the device 402 in accordance with examples as disclosed herein. Processor 404 may be configured as or otherwise support a means for transmitting, to a NWDAF containing a MTLF, a first signaling indicating a request to provision a ML model; receiving, from the NWDAF containing the MTLF, a second signaling indicating a first protected ML model that has been protected using a first security context; storing at least one of a first validity time for the first security context and a first storage duration for the first protected ML model; and deleting the protected ML model in response to the first the first validity time expiring or the first storage duration expiring.

Additionally or alternatively, the processor 404 may be configured to or otherwise support: where the second signaling further indicates the first validity time; where the second signaling further indicates the first validity time, and further including: store the validity time for the first security context; further including: transmitting, to the NWDAF containing the MTLF, a third signaling indicating a request to update training of the ML model; and receiving, from the NWDAF containing the MTLF, a fourth signaling indicating a second protected ML model and a second validity time for a second security context for the second protected ML; further including: receiving, from the NWDAF containing the MTLF, a third signaling indicating a second validity time and a second protected ML model that has been protected using a second security context; and storing the second validity time and the second protected ML; further including: receiving, from the NWDAF containing the MTLF in response to the first validity time for the first security context having expired but the first storage duration time for the first protected ML not having expired, a third signaling indicating a second validity time and a second protected ML model that has been protected using a second security context; and storing the second validity time and the second protected ML; further including: transmitting, to a NRF, a third signaling indicating a discovery request for the NWDAF containing the MTLF; receiving, from the NRF, a fourth signaling indicating the first storage duration and the NWDAF containing the MTLF; and storing the first storage duration with an analytics identifier of an NWDAF containing an AnLF; further including: generating the first storage duration; and storing the first storage duration with an analytics identifier of a NWDAF containing an AnLF; further including transmitting, to the NWDAF containing the MTLF, a third signaling indicating the storage duration; where the first security context comprises an encryption key and an integrity protection key.

The processor 404 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some implementations, the processor 404 may be configured to operate a memory array using a memory controller. In some other implementations, a memory controller may be integrated into the processor 404. The processor 404 may be configured to execute computer-readable instructions stored in a memory (e.g., the memory 406) to cause the device 402 to perform various functions of the present disclosure.

The memory 406 may include random access memory (RAM) and read-only memory (ROM). The memory 406 may store computer-readable, computer-executable code including instructions that, when executed by the processor 404 cause the device 402 to perform various functions described herein. The code may be stored in a non-transitory computer-readable medium such as system memory or another type of memory. In some implementations, the code may not be directly executable by the processor 404 but may cause a computer (e.g., when compiled and executed) to perform functions described herein. In some implementations, the memory 406 may include, among other things, a basic I/O system (BIOS) which may control basic hardware or software operation such as the interaction with peripheral components or devices.

The I/O controller 410 may manage input and output signals for the device 402. The I/O controller 410 may also manage peripherals not integrated into the device M02. In some implementations, the I/O controller 410 may represent a physical connection or port to an external peripheral. In some implementations, the I/O controller 410 may utilize an operating system such as iOS®, ANDROID®, MS-DOS®, MS-WINDOWS®, OS/2®, UNIX®, LINUX®, or another known operating system. In some implementations, the I/O controller 410 may be implemented as part of a processor, such as the processor 404. In some implementations, a user may interact with the device 402 via the I/O controller 410 or via hardware components controlled by the I/O controller 410.

In some implementations, the device 402 may include a single antenna 412. However, in some other implementations, the device 402 may have more than one antenna 412 (i.e., multiple antennas), including multiple antenna panels or antenna arrays, which may be capable of concurrently transmitting or receiving multiple wireless transmissions. The transceiver 408 may communicate bi-directionally, via the one or more antennas 412, wired, or wireless links as described herein. For example, the transceiver 408 may represent a wireless transceiver and may communicate bi-directionally with another wireless transceiver. The transceiver 408 may also include a modem to modulate the packets, to provide the modulated packets to one or more antennas 412 for transmission, and to demodulate packets received from the one or more antennas 412.

Figure 5:
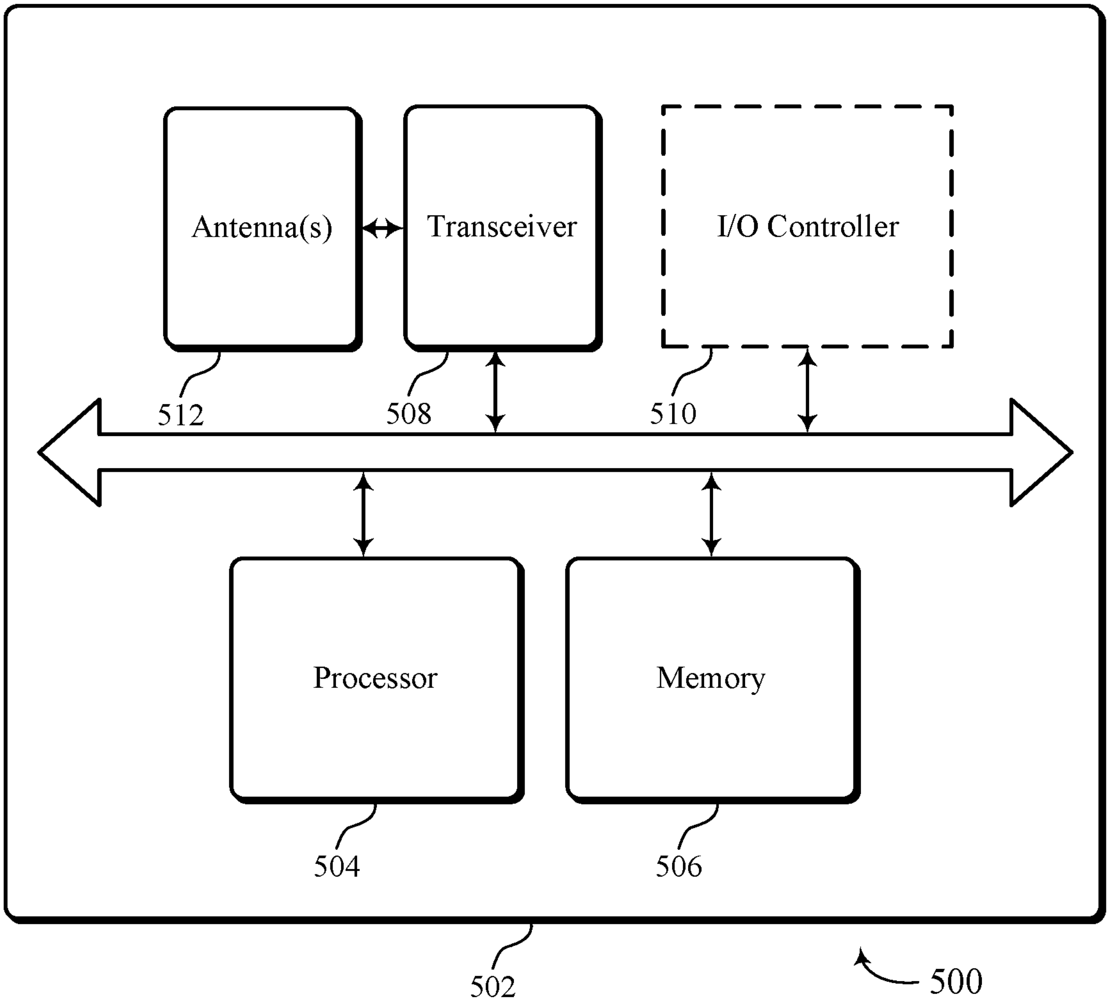

FIG. 5 illustrates an example of a block diagram 500 of a device 502 that supports key management for machine learning models in accordance with aspects of the present disclosure. The device 502 may be an example of a device in the core network 106, such as a device implementing an NWDAF containing the MTLF 120 as described herein. The device 502 may support wireless communication with one or more network entities 102, UEs 104, or any combination thereof. The device 502 may include components for bi-directional communications including components for transmitting and receiving communications, such as a processor 504, a memory 506, a transceiver 508, and an I/O controller 510. These components may be in electronic communication or otherwise coupled (e.g., operatively, communicatively, functionally, electronically, electrically) via one or more interfaces (e.g., buses).

The processor 504, the memory 506, the transceiver 508, or various combinations thereof or various components thereof may be examples of means for performing various aspects of the present disclosure as described herein. For example, the processor 504, the memory 506, the transceiver 508, or various combinations or components thereof may support a method for performing one or more of the operations described herein.

In some implementations, the processor 504, the memory 506, the transceiver 508, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some implementations, the processor 504 and the memory 506 coupled with the processor 504 may be configured to perform one or more of the functions described herein (e.g., executing, by the processor 504, instructions stored in the memory 506).

Processor 504 may be configured as or otherwise support to: receive, from an ADRF, a first signaling indicating a request to provision a ML model; generate a first security context; encrypt, using the first security context, the ML model resulting in a first protected ML model; store the first security context and at least one of a first storage duration for the protected ML and a first validity time for the first security context; transmit, to the ADRF, a second signaling indicating the first protected ML model; and delete the first security context in response to the first validity time expiring or the first storage duration expiring.

Additionally or alternatively, the processor 504 may be configured to or otherwise support: where the processor is further configured to: generate the first validity time for the first security context; store the first validity time; and transmit, to the ADRF, the second signaling indicating the first validity time; where the processor is further configured to: receive, from the ADRF, a third signaling indicating a request to update training of the ML model; and transmit, to the ADRF, a fourth signaling indicating a second protected ML model and a second validity time for a second security context for the second protected ML; where the processor is further configured to: generate a second security context; encrypt, using the second security context, the ML model resulting in a second protected ML model; generate a second validity time for the second security context; store the second security context and the second validity time; and transmit, to the ADRF, a third signaling indicating the second validity time and the second protected ML; where the processor is further configured to, in response to the first validity time for the first security context having expired but the first storage duration time for the first protected ML not having expired: generate a second security context; encrypt, using the second security context, the ML model resulting in a second protected ML model; generate a second validity time for the second security context; store the second security context and the second validity time; and transmit, to the ADRF, a third signaling indicating the second validity time and the second protected ML; where the processor is further configured to: receive, from the ADRF, the storage duration; and store the storage duration; where the processor is further configured to delete the first security context in response to the storage duration expiring; where the processor is further configured to: receive a third signaling indicating a request to unsubscribe from the ML model; and delete the first security context in response to the third signaling; where the first security context comprises an encryption key and an integrity protection key.

For example, the processor 504 may support wireless communication at the device 502 in accordance with examples as disclosed herein. Processor 504 may be configured as or otherwise support a means for receiving, from an ADRF, a first signaling indicating a request to provision a ML model; generating a first security context; encrypting, using the first security context, the ML model resulting in a first protected ML model; storing the first security context and at least one of a first storage duration for the protected ML and a first validity time for the first security context; transmitting, to the ADRF, a second signaling indicating the first protected ML model; and deleting the first security context in response to the first validity time expiring or the first storage duration expiring.

Additionally or alternatively, the processor 504 may be configured to or otherwise support: further including: generating the first validity time for the first security context; storing the first validity time; and transmitting, to the ADRF, the second signaling indicating the first validity time; further including: receiving, from the ADRF, a third signaling indicating a request to update training of the ML model; and transmitting, to the ADRF, a fourth signaling indicating a second protected ML model and a second validity time for a second security context for the second protected ML; further including: generating a second security context; encrypting, using the second security context, the ML model resulting in a second protected ML model; generating a second validity time for the second security context; storing the second security context and the second validity time; and transmitting, to the ADRF, a third signaling indicating the second validity time and the second protected ML; further including, in response to the first validity time for the first security context having expired but the first storage duration time for the first protected ML not having expired: generating a second security context; encrypting, using the second security context, the ML model resulting in a second protected ML model; generating a second validity time for the second security context; storing the second security context and the second validity time; and transmitting, to the ADRF, a third signaling indicating the second validity time and the second protected ML; further including: receiving, from the ADRF, the storage duration; and storing the storage duration; further including deleting the first security context in response to the storage duration expiring; further including: receiving a third signaling indicating a request to unsubscribe from the ML model; and deleting the first security context in response to the third signaling; where the first security context comprises an encryption key and an integrity protection key.

The processor 504 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some implementations, the processor 504 may be configured to operate a memory array using a memory controller. In some other implementations, a memory controller may be integrated into the processor 504. The processor 504 may be configured to execute computer-readable instructions stored in a memory (e.g., the memory 506) to cause the device 502 to perform various functions of the present disclosure.

The memory 506 may include random access memory (RAM) and read-only memory (ROM). The memory 506 may store computer-readable, computer-executable code including instructions that, when executed by the processor 504 cause the device 502 to perform various functions described herein. The code may be stored in a non-transitory computer-readable medium such as system memory or another type of memory. In some implementations, the code may not be directly executable by the processor 504 but may cause a computer (e.g., when compiled and executed) to perform functions described herein. In some implementations, the memory 506 may include, among other things, a basic I/O system (BIOS) which may control basic hardware or software operation such as the interaction with peripheral components or devices.

The I/O controller 510 may manage input and output signals for the device 502. The I/O controller 510 may also manage peripherals not integrated into the device M02. In some implementations, the I/O controller 510 may represent a physical connection or port to an external peripheral. In some implementations, the I/O controller 510 may utilize an operating system such as iOS®, ANDROID®, MS-DOS®, MS-WINDOWS®, OS/2®, UNIX®, LINUX®, or another known operating system. In some implementations, the I/O controller 510 may be implemented as part of a processor, such as the processor 504. In some implementations, a user may interact with the device 502 via the I/O controller 510 or via hardware components controlled by the I/O controller 510.

In some implementations, the device 502 may include a single antenna 512. However, in some other implementations, the device 502 may have more than one antenna 512 (i.e., multiple antennas), including multiple antenna panels or antenna arrays, which may be capable of concurrently transmitting or receiving multiple wireless transmissions. The transceiver 508 may communicate bi-directionally, via the one or more antennas 512, wired, or wireless links as described herein. For example, the transceiver 508 may represent a wireless transceiver and may communicate bi-directionally with another wireless transceiver. The transceiver 508 may also include a modem to modulate the packets, to provide the modulated packets to one or more antennas 512 for transmission, and to demodulate packets received from the one or more antennas 512.

Figure 6:
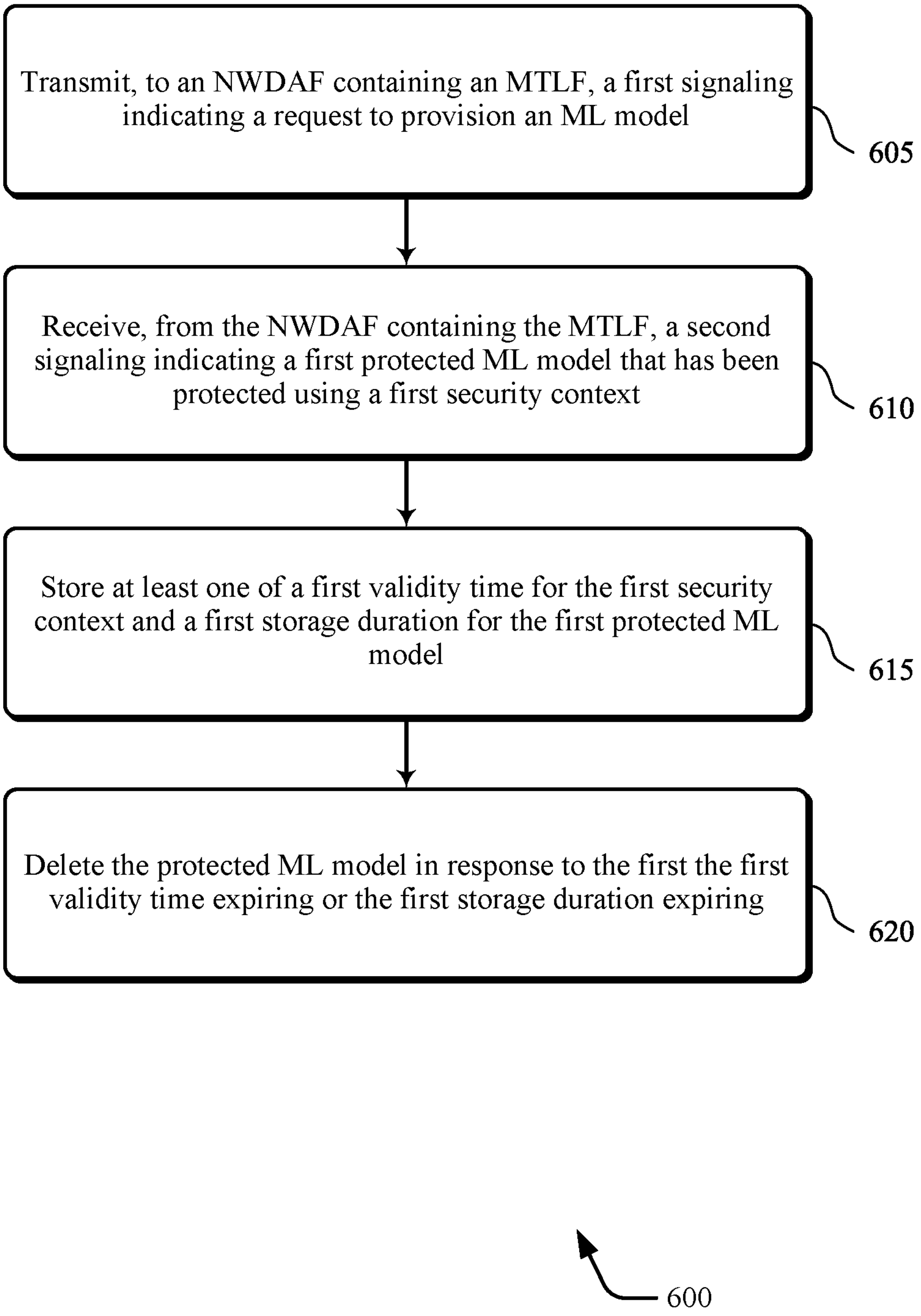
FIGS. 6 through 11 illustrate flowcharts of methods that support key management for machine learning models in accordance with aspects of the present disclosure.

FIG. 6 illustrates a flowchart of a method 600 that supports key management for machine learning models in accordance with aspects of the present disclosure. The operations of the method 600 may be implemented by a device or its components as described herein. For example, the operations of the method 600 may be performed by a device implementing an ADRF as described with reference to FIGS. 1 through 5. In some implementations, the device may execute a set of instructions to control the function elements of the device to perform the described functions. Additionally, or alternatively, the device may perform aspects of the described functions using special-purpose hardware.

At 605, the method may include transmitting, to an NWDAF containing an MTLF, a first signaling indicating a request to provision an ML model. The operations of 605 may be performed in accordance with examples as described herein. In some implementations, aspects of the operations of 605 may be performed by a device as described with reference to FIG. 1.

At 610, the method may include receiving, from the NWDAF containing the MTLF, a second signaling indicating a first protected ML model that has been protected using a first security context. The operations of 610 may be performed in accordance with examples as described herein. In some implementations, aspects of the operations of 610 may be performed by a device as described with reference to FIG. 1.

At 615, the method may include storing at least one of a first validity time for the first security context and a first storage duration for the first protected ML model. The operations of 615 may be performed in accordance with examples as described herein. In some implementations, aspects of the operations of 615 may be performed by a device as described with reference to FIG. 1.

At 620, the method may include deleting the protected ML model in response to the first the first validity time expiring or the first storage duration expiring. The operations of 620 may be performed in accordance with examples as described herein. In some implementations, aspects of the operations of 620 may be performed by a device as described with reference to FIG. 1.

Figure 7:
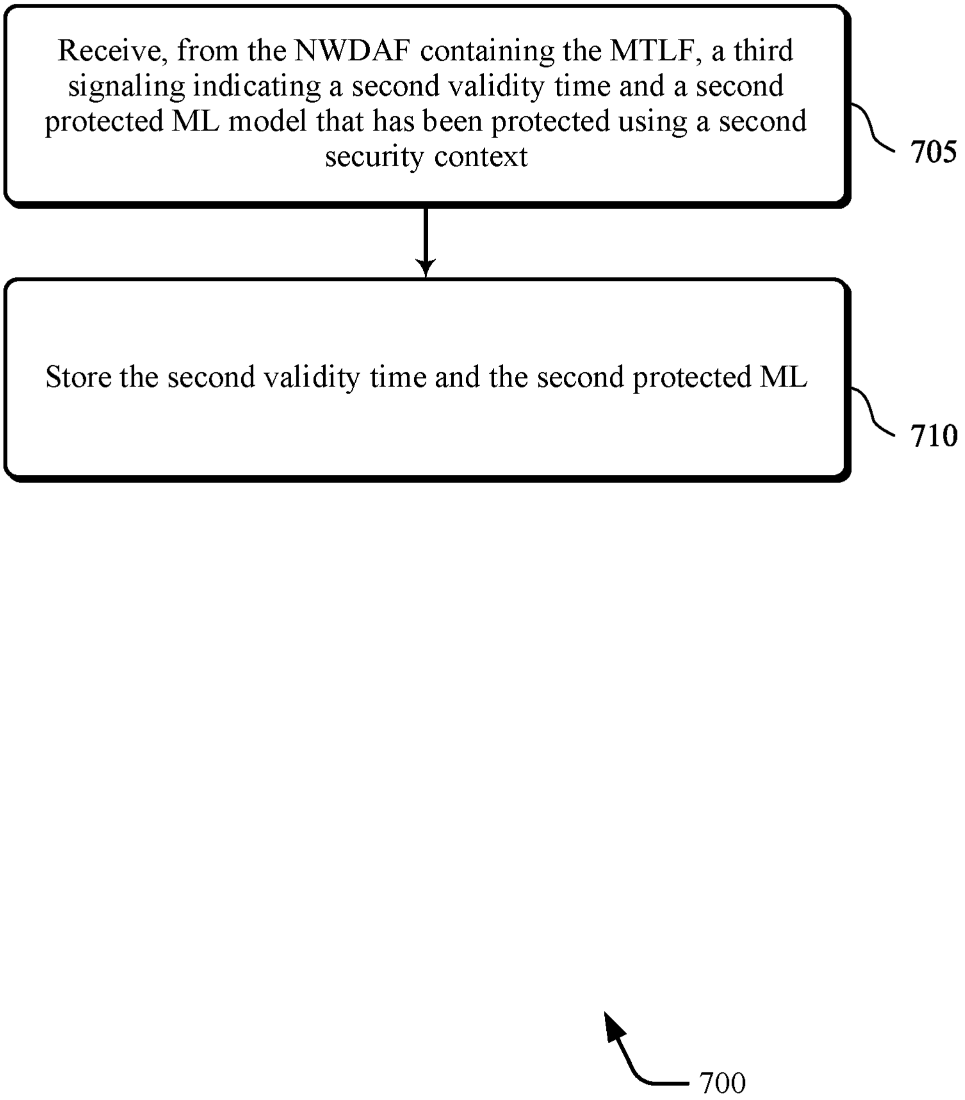

FIG. 7 illustrates a flowchart of a method 700 that supports key management for machine learning models in accordance with aspects of the present disclosure. The operations of the method 700 may be implemented by a device or its components as described herein. For example, the operations of the method 700 may be performed by a device implementing an ADRF as described with reference to FIGS. 1 through 5. In some implementations, the device may execute a set of instructions to control the function elements of the device to perform the described functions. Additionally, or alternatively, the device may perform aspects of the described functions using special-purpose hardware.

At 705, the method may include receiving, from the NWDAF containing the MTLF, a third signaling indicating a second validity time and a second protected ML model that has been protected using a second security context. The operations of 705 may be performed in accordance with examples as described herein. In some implementations, aspects of the operations of 705 may be performed by a device as described with reference to FIG. 1.

At 710, the method may include storing the second validity time and the second protected ML. The operations of 710 may be performed in accordance with examples as described herein. In some implementations, aspects of the operations of 710 may be performed by a device as described with reference to FIG. 1.

Figure 8:
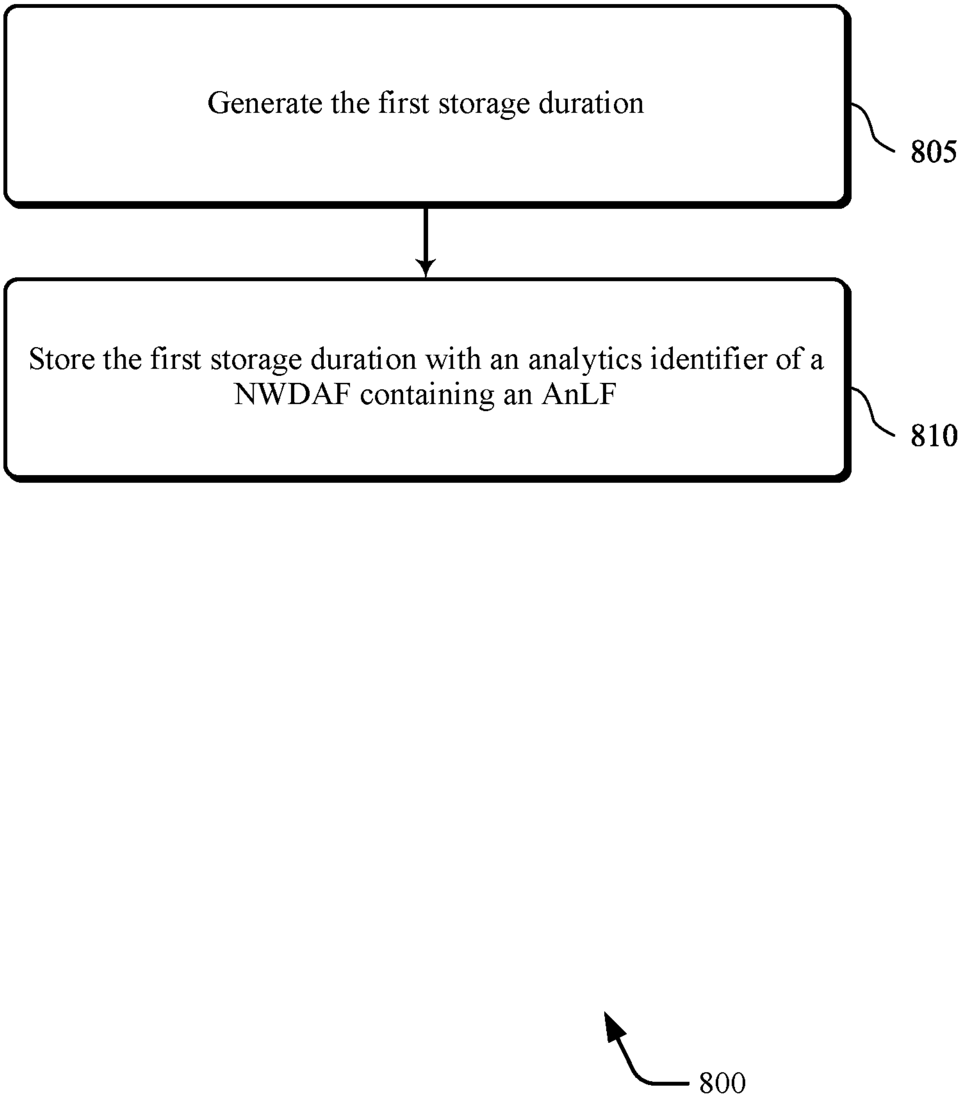

FIG. 8 illustrates a flowchart of a method 800 that supports key management for machine learning models in accordance with aspects of the present disclosure. The operations of the method 800 may be implemented by a device or its components as described herein. For example, the operations of the method 800 may be performed by a device implementing an ADRF as described with reference to FIGS. 1 through 5. In some implementations, the device may execute a set of instructions to control the function elements of the device to perform the described functions. Additionally, or alternatively, the device may perform aspects of the described functions using special-purpose hardware.

At 805, the method may include generating the first storage duration. The operations of 805 may be performed in accordance with examples as described herein. In some implementations, aspects of the operations of 805 may be performed by a device as described with reference to FIG. 1.

At 810, the method may include storing the first storage duration with an analytics identifier of a NWDAF containing an AnLF. The operations of 810 may be performed in accordance with examples as described herein. In some implementations, aspects of the operations of 810 may be performed by a device as described with reference to FIG. 1.

Figure 9:
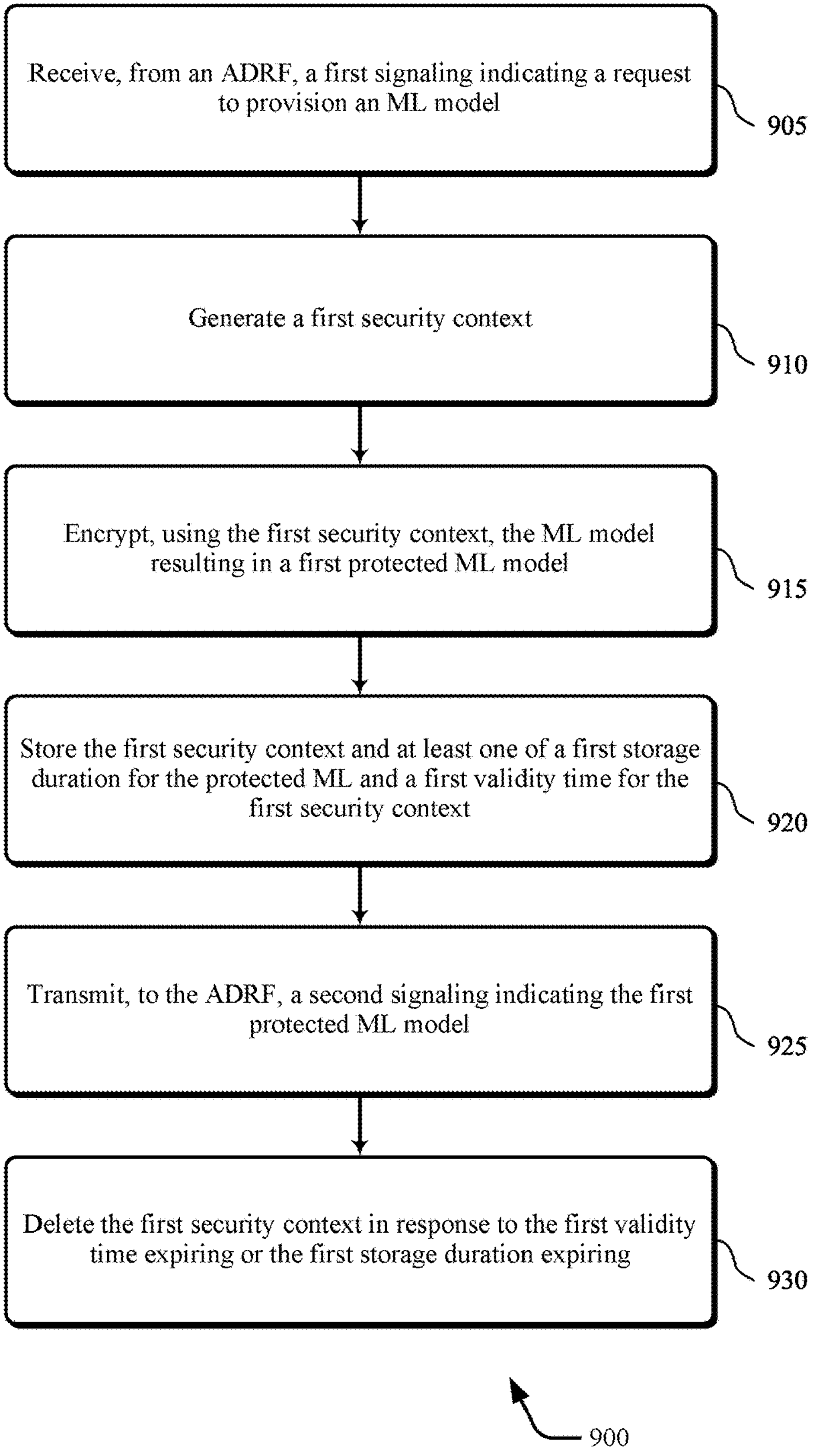

FIG. 9 illustrates a flowchart of a method 900 that supports key management for machine learning models in accordance with aspects of the present disclosure. The operations of the method 900 may be implemented by a device or its components as described herein. For example, the operations of the method 900 may be performed by device implementing a NWDAF containing the MTLF as described with reference to FIGS. 1 through 5. In some implementations, the device may execute a set of instructions to control the function elements of the device to perform the described functions. Additionally, or alternatively, the device may perform aspects of the described functions using special-purpose hardware.

At 905, the method may include receiving, from an ADRF, a first signaling indicating a request to provision an ML model. The operations of 905 may be performed in accordance with examples as described herein. In some implementations, aspects of the operations of 905 may be performed by a device as described with reference to FIG. 1.

At 910, the method may include generating a first security context. The operations of 910 may be performed in accordance with examples as described herein. In some implementations, aspects of the operations of 910 may be performed by a device as described with reference to FIG. 1.

At 915, the method may include encrypting, using the first security context, the ML model resulting in a first protected ML model. The operations of 915 may be performed in accordance with examples as described herein. In some implementations, aspects of the operations of 915 may be performed by a device as described with reference to FIG. 1.

At 920, the method may include storing the first security context and at least one of a first storage duration for the protected ML and a first validity time for the first security context. The operations of 920 may be performed in accordance with examples as described herein. In some implementations, aspects of the operations of 920 may be performed by a device as described with reference to FIG. 1.

At 925, the method may include transmitting, to the ADRF, a second signaling indicating the first protected ML model. The operations of 925 may be performed in accordance with examples as described herein. In some implementations, aspects of the operations of 925 may be performed by a device as described with reference to FIG. 1.

At 930, the method may include deleting the first security context in response to the first validity time expiring or the first storage duration expiring. The operations of 930 may be performed in accordance with examples as described herein. In some implementations, aspects of the operations of 930 may be performed by a device as described with reference to FIG. 1.

Figure 10:
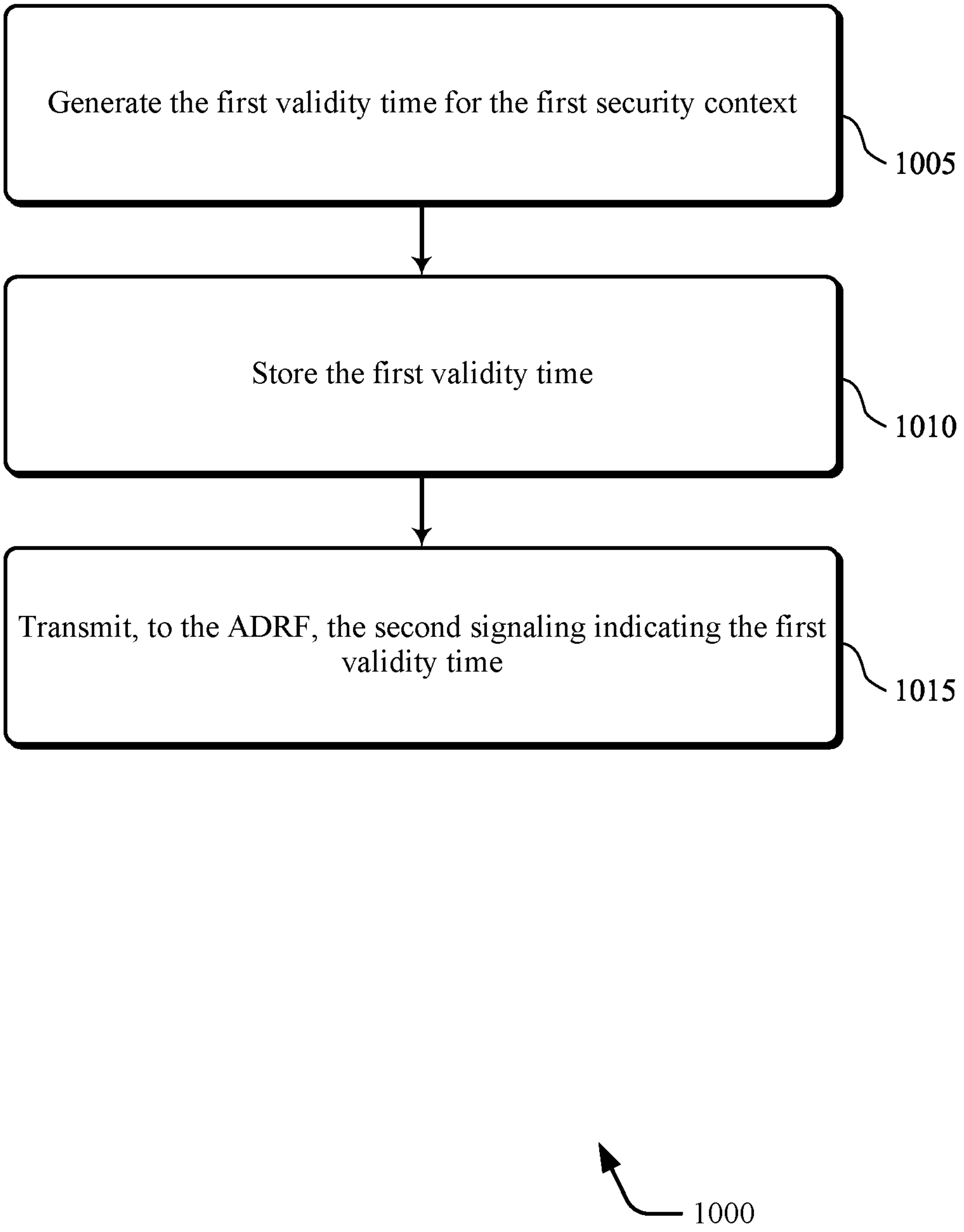

FIG. 10 illustrates a flowchart of a method 1000 that supports key management for machine learning models in accordance with aspects of the present disclosure. The operations of the method 1000 may be implemented by a device or its components as described herein. For example, the operations of the method 1000 may be performed by device implementing a NWDAF containing the MTLF as described with reference to FIGS. 1 through 5. In some implementations, the device may execute a set of instructions to control the function elements of the device to perform the described functions. Additionally, or alternatively, the device may perform aspects of the described functions using special-purpose hardware.

At 1005, the method may include generating the first validity time for the first security context. The operations of 1005 may be performed in accordance with examples as described herein. In some implementations, aspects of the operations of 1005 may be performed by a device as described with reference to FIG. 1.

At 1010, the method may include storing the first validity time. The operations of 1010 may be performed in accordance with examples as described herein. In some implementations, aspects of the operations of 1010 may be performed by a device as described with reference to FIG. 1.

At 1015, the method may include transmitting, to the ADRF, the second signaling indicating the first validity time. The operations of 1015 may be performed in accordance with examples as described herein. In some implementations, aspects of the operations of 1015 may be performed by a device as described with reference to FIG. 1.

Figure 11:
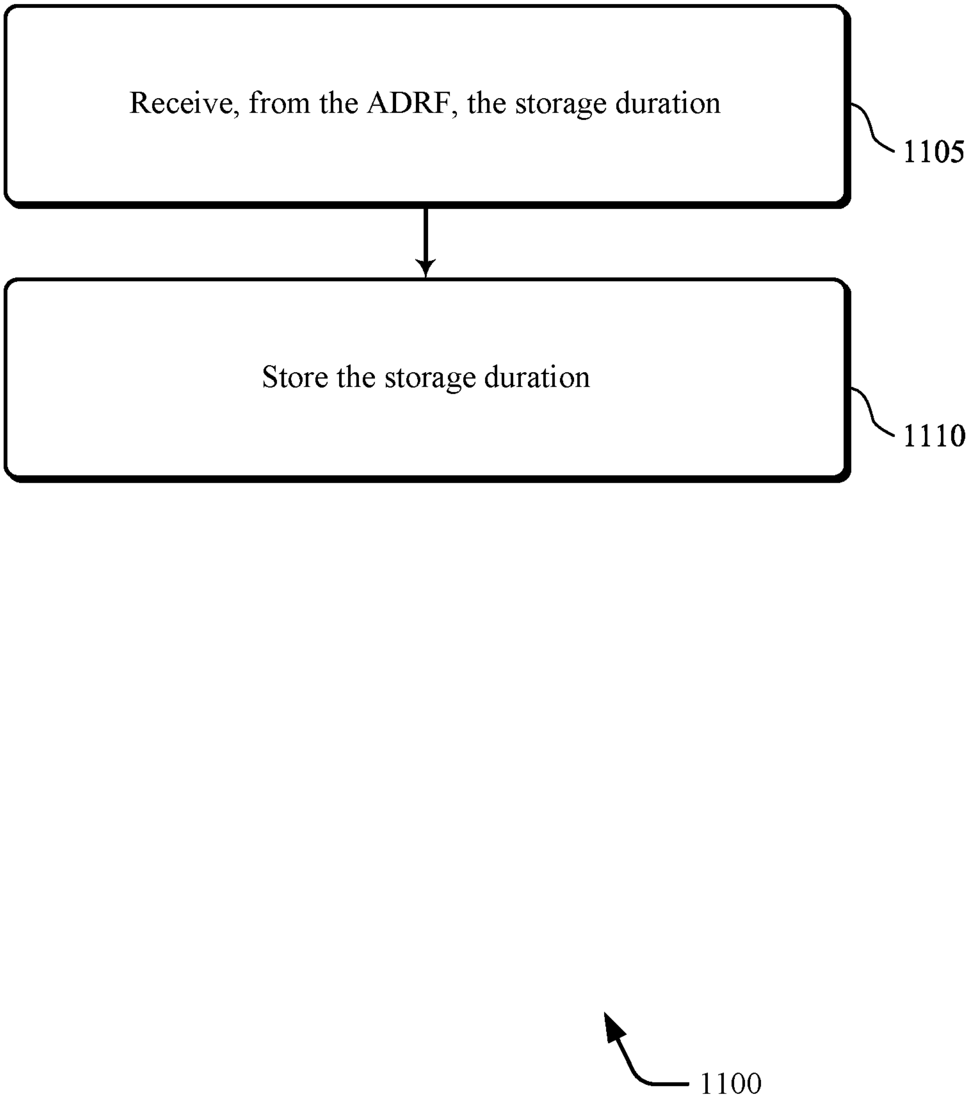

FIG. 11 illustrates a flowchart of a method 1100 that supports key management for machine learning models in accordance with aspects of the present disclosure. The operations of the method 1100 may be implemented by a device or its components as described herein. For example, the operations of the method 1100 may be performed by device implementing a NWDAF containing the MTLF as described with reference to FIGS. 1 through 5. In some implementations, the device may execute a set of instructions to control the function elements of the device to perform the described functions. Additionally, or alternatively, the device may perform aspects of the described functions using special-purpose hardware.

At 1105, the method may include receiving, from the ADRF, the storage duration. The operations of 1105 may be performed in accordance with examples as described herein. In some implementations, aspects of the operations of 1105 may be performed by a device as described with reference to FIG. 1.

At 1110, the method may include storing the storage duration. The operations of 1110 may be performed in accordance with examples as described herein. In some implementations, aspects of the operations of 1110 may be performed by a device as described with reference to FIG. 1.

It should be noted that the methods described herein describes possible implementations, and that the operations and the steps may be rearranged or otherwise modified and that other implementations are possible. Further, aspects from two or more of the methods may be combined.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor.

Any connection may be properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of" or "one or both of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on. Further, as used herein, including in the claims, a "set" may include one or more elements.

The terms "transmitting," "receiving," or "communicating," when referring to a network entity, may refer to any portion of a network entity (e.g., a base station, a CU, a DU, a RU) of a RAN communicating with another device (e.g., directly or via one or more other network entities).

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form to avoid obscuring the concepts of the described example.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication, comprising:

at least one non-transitory memory; and at least one processor coupled with the at least one non-transitory memory and configured to cause the apparatus to:

transmit, to a network data analytics function (NWDAF) containing a model training logical function (MTLF), a first signaling indicating a request to provision a machine learning (ML) model;

receive, from the NWDAF containing the MTLF, a second signaling indicating a first protected ML model that has been protected using a first security context;

store at least one of a first validity time for the first security context and a first storage duration for the first protected ML model; and delete the protected ML model in response to the first the first validity time expiring or the first storage duration expiring.

2. The apparatus of claim 1, wherein the second signaling further indicates the first validity time.

3. The apparatus of claim 1, wherein the second signaling further indicates the first validity time, and the at least one processor is further configured to cause the apparatus to:

store the validity time for the first security context.

4. The apparatus of claim 3, wherein the at least one processor is further configured to cause the apparatus to:

transmit, to the NWDAF containing the MTLF, a third signaling indicating a request to update training of the ML model; and receive, from the NWDAF containing the MTLF, a fourth signaling indicating a second protected ML model and a second validity time for a second security context for the second protected ML.

5. The apparatus of claim 1, wherein the at least one processor is further configured to cause the apparatus to:

receive, from the NWDAF containing the MTLF, a third signaling indicating a second validity time and a second protected ML model that has been protected using a second security context; and store the second validity time and the second protected ML.

6. The apparatus of claim 1, wherein the at least one processor is further configured to cause the apparatus to:

receive, from the NWDAF containing the MTLF in response to the first validity time for the first security context having expired but the first storage duration time for the first protected ML not having expired, a third signaling indicating a second validity time and a second protected ML model that has been protected using a second security context; and store the second validity time and the second protected ML.

7. The apparatus of claim 1, wherein the at least one processor is further configured to cause the apparatus to:

transmit, to a network function repository function (NRF), a third signaling indicating a discovery request for the NWDAF containing the MTLF;

receive, from the NRF, a fourth signaling indicating the first storage duration and the NWDAF containing the MTLF; and store the first storage duration with an analytics identifier of an NWDAF containing an analytics logical function (AnLF).

8. The apparatus of claim 1, wherein the at least one processor is further configured to cause the apparatus to:

generate the first storage duration; and store the first storage duration with an analytics identifier of a NWDAF containing an analytics logical function (AnLF).

9. The apparatus of claim 1, wherein the at least one processor is further configured to cause the apparatus to transmit, to the NWDAF containing the MTLF, a third signaling indicating the storage duration.

10. An apparatus for wireless communication, comprising:

at least one non-transitory memory; and at least one processor coupled with the at least one non-transitory memory and configured to cause the apparatus to:

receive, from an analytics data repository function (ADRF), a first signaling indicating a request to provision a machine learning (ML) model;

generate a first security context;

encrypt, using the first security context, the ML model resulting in a first protected ML model;

store the first security context and at least one of a first storage duration for the protected ML and a first validity time for the first security context;

transmit, to the ADRF, a second signaling indicating the first protected ML model; and delete the first security context in response to the first validity time expiring or the first storage duration expiring.

11. The apparatus of claim 10, wherein the at least one processor is further configured to cause the apparatus to:

generate the first validity time for the first security context;

store the first validity time; and transmit, to the ADRF, the second signaling indicating the first validity time.

12. The apparatus of claim 11, wherein the at least one processor is further configured to cause the apparatus to:

receive, from the ADRF, a third signaling indicating a request to update training of the ML model; and transmit, to the ADRF, a fourth signaling indicating a second protected ML model and a second validity time for a second security context for the second protected ML.

13. The apparatus of claim 10, wherein the at least one processor is further configured to cause the apparatus to:

generate a second security context;

encrypt, using the second security context, the ML model resulting in a second protected ML model;

generate a second validity time for the second security context;

store the second security context and the second validity time; and transmit, to the ADRF, a third signaling indicating the second validity time and the second protected ML.

14. The apparatus of claim 10, wherein the at least one processor is further configured to cause the apparatus to, in response to the first validity time for the first security context having expired but the first storage duration time for the first protected ML not having expired:

generate a second security context;

encrypt, using the second security context, the ML model resulting in a second protected ML model;

generate a second validity time for the second security context;

store the second security context and the second validity time; and transmit, to the ADRF, a third signaling indicating the second validity time and the second protected ML.

15. The apparatus of claim 10, wherein the at least one processor is further configured to cause the apparatus to:

receive, from the ADRF, the storage duration; and store the storage duration.

16. The apparatus of claim 15, wherein the at least one processor is further configured to cause the apparatus to delete the first security context in response to the storage duration expiring.

17. The apparatus of claim 10, wherein the at least one processor is further configured to cause the apparatus to:

receive a third signaling indicating a request to unsubscribe from the ML model; and delete the first security context in response to the third signaling.

18. A method, comprising:

transmitting, to a network data analytics function (NWDAF) containing a model training logical function (MTLF), a first signaling indicating a request to provision a machine learning (ML) model;

receiving, from the NWDAF containing the MTLF, a second signaling indicating a first protected ML model that has been protected using a first security context;

storing at least one of a first validity time for the first security context and a first storage duration for the first protected ML model; and deleting the protected ML model in response to the first the first validity time expiring or the first storage duration expiring.

19. The method of claim 18, wherein the second signaling further indicates the first validity time.

20. A method, comprising:

receiving, from an analytics data repository function (ADRF), a first signaling indicating a request to provision a machine learning (ML) model;

generating a first security context;

encrypting, using the first security context, the ML model resulting in a first protected ML model;

storing the first security context and at least one of a first storage duration for the protected ML and a first validity time for the first security context;

transmitting, to the ADRF, a second signaling indicating the first protected ML model; and deleting the first security context in response to the first validity time expiring or the first storage duration expiring.

* * * * *